(12) United States Patent
Keeler et al.

(10) Patent No.: US 7,481,205 B2
(45) Date of Patent: *Jan. 27, 2009

(54) HIGH FREQUENCY VAPORIZED FUEL INJECTOR

(75) Inventors: David H. Keeler, Midlothian, VA (US); Francis M. Sprinkel, Glen Allen, VA (US); Niranjan Maharajh, Richmond, VA (US); Mimmo Elia, Watertown, MA (US); Josh Breinlinger, Hampstead, NH (US); Jan-Roger Linna, Boston, MA (US)

(73) Assignee: Philip Morris USA Inc., Richmond, VA (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/266,161

(22) Filed: Nov. 3, 2005

(65) Prior Publication Data

US 2006/0094566 A1    May 4, 2006

Related U.S. Application Data

(60) Provisional application No. 60/624,601, filed on Nov. 3, 2004.

(51) Int. Cl.
*F02G 5/00* (2006.01)
(52) U.S. Cl. ...................... 123/549; 123/557
(58) Field of Classification Search .......... 123/543–557
See application file for complete search history.

(56) References Cited

U.S. PATENT DOCUMENTS

| 3,731,880 | A | * | 5/1973 | Williams ................. 239/585.1 |
| 3,868,939 | A |   | 3/1975 | Friese et al. |
| 4,091,773 | A |   | 5/1978 | Gunda |
| 4,096,833 | A |   | 6/1978 | Sweet |
| 4,269,157 | A |   | 5/1981 | Fujishiro |
| 4,388,907 | A | * | 6/1983 | Sugo et al. ................. 123/494 |
| 4,724,816 | A |   | 2/1988 | Kanno et al. |
| 5,076,238 | A |   | 12/1991 | Rosenau et al. |
| 5,671,716 | A |   | 9/1997 | Hetrick et al. |
| 6,086,716 | A |   | 7/2000 | Watson et al. |
| 6,367,452 | B1 |   | 4/2002 | Shima et al. |
| 6,390,076 | B2 | * | 5/2002 | Hunt .......................... 123/549 |

(Continued)

FOREIGN PATENT DOCUMENTS

WO    WO 2004/065769 A2    8/2004

(Continued)

*Primary Examiner*—M. McMahon
(74) *Attorney, Agent, or Firm*—Roberts Mlotkowski Safran & Cole, P.C.

(57) ABSTRACT

There is provided a fuel injector system for vaporizing liquid fuel and metering the vapor to an internal combustion engine of an automobile. The system has at least one fuel injector with at least one capillary flow passage with a heat source arranged along the flow passage capable of heating liquid fuel in the flow passage to a level sufficient to vaporize it, a solenoid operated metering valve located at the capillary outlet for metering vaporized fuel to the internal combustion engine, and a system for operating the metering valve while delivering the vaporized fuel at an opening and closing frequency of at least 15 Hz or more preferably at least 60 Hz independent of engine rpm. The system is expected to be useful for starting a cold engine with reduced emissions.

18 Claims, 15 Drawing Sheets

U.S. PATENT DOCUMENTS

| | | |
|---|---|---|
| 6,571,776 B1 | 6/2003 | Dunsworth |
| 6,651,602 B2 | 11/2003 | Hiraku et al. |
| 6,684,853 B1 | 2/2004 | Lei |
| 6,820,598 B2 * | 11/2004 | Pellizzari et al. ............ 123/549 |
| 6,871,792 B2 * | 3/2005 | Pellizzari ....................... 239/5 |
| 2001/0056322 A1 | 12/2001 | Yoshizawa et al. |
| 2002/0083919 A1 | 7/2002 | Rodriguez-Amaya et al. |
| 2004/0000296 A1 | 1/2004 | Linna et al. |
| 2004/0181760 A1 | 9/2004 | Ismallov |
| 2004/0182375 A1 | 9/2004 | Linna et al. |
| 2005/0258266 A1 * | 11/2005 | Elia et al. ...................... 239/5 |

FOREIGN PATENT DOCUMENTS

WO    WO 2005/042964 A1    5/2005

* cited by examiner

HIGH FREQUENCY VAPORIZED FUEL INJECTOR

CROSS REFERENCE TO RELATED APPLICATIONS

This application claims priority from U.S. Provisional Application Ser. No. 60/624,601, filed Nov. 3, 2004, and is incorporated in its entirety by reference.

FIELD

The present invention relates to fuel delivery in an internal combustion engine.

BACKGROUND

In light of the ever more stringent emissions regulations that are planned to take effect over the next few years, including California Low Emission Vehicle II (LEV II), Federal USA EPA Tier 2, and European Union EU-IV and EU-V, pre-catalyst engine-out hydrocarbon (HC) emissions, especially during cold start and warm-up, are attracting significant efforts in research and development. This is due, in large part, to the fact that as much as 80 percent of the total hydrocarbon emissions produced by a typical, modern, light-duty vehicle during the Federal Test Procedure (FTP) can occur during the first 120 seconds of the test.

These high levels of emissions are largely attributable to cold engine and exhaust component temperatures. Specifically, cold engine components necessitate fuel-rich operation, in which the excess fuel is used to compensate for the portion of fuel that has attached to the walls of the intake system and combustion chamber and, thus, is not readily combusted. In addition, a cold three-way catalyst cannot reduce a significant amount of the unburned hydrocarbons that pass through the engine during cold-start. As a result, high concentrations of unburned hydrocarbons are emitted from the tailpipe. It is understood in the art that the over-fueling associated with excessive hydrocarbon emissions during cold-start could be considerably reduced through the use of gasoline vapor rather than liquid gasoline.

A variety of systems have been devised to supply fine liquid fuel droplets and air to internal combustion engines that work relatively well after engine warm-up. These systems either supply fuel directly into the combustion chamber (direct injection) or utilize carburetor(s) or fuel injector(s) to supply the mixture through an intake manifold into a combustion chamber (indirect injection). In currently employed fuel injected systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold. Under normal operating conditions, the liquid fuel forms a film on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized by controlling the injection timing such that the atomized liquid fuel is injected once per engine cycle for each cylinder and timed such that fuel is injected when the engine intake valve of that cylinder is closed, not open. This fuel injection firing strategy, synchronous, closed-valve, sequential, single fire, fuel injection, has become the preferred practice for automotive applications. Nonetheless, several other injection firing strategies have been developed over the years as outlined by the Society of Automotive Engineering—Surface Vehicle Recommended Practice SAE-J1832 (Rev. February 2001) "Low Pressure Gasoline Fuel Injector." These alternative fuel injection firing strategies include: simultaneous double fire, alternating double fire, simultaneous single fire, sequential single fire, and make-up fueling.

However, sequential single firing has become the preferred approach for very good reasons. First, the timing can be chosen for each cylinder so that injection only occurs when the engine intake valve of that cylinder is closed which eliminates the risk of having liquid fuel spray entering the cylinder. Second, the number of injection events per engine cycle is limited to one. If the injection is broken up into several repeated injections in every engine cycle, the injectors have to be cycled at shorter pulse widths (i.e., shorter duration for each injection) to keep the fuel flow the same as for one single injection event per engine cycle. This is especially critical at low engine loads such as engine idling since where fuel required is relatively low. When metering liquid fuel, the injectors have to be cycled at very short pulse widths if injection occurs several times per engine cycle. From a dynamic standpoint, it is preferred not to operate injectors at very short pulse widths, e.g., less than about 1 ms, since all injectors tend to be non-linear when very short pulses are used (i.e. the amount of fuel delivered does not scale linearly with the pulse width at very short pulse width durations). Operating a fuel injector in the non-linear region tends to make fuel control less precise and more difficult.

In addition to the different injection firing strategies outlined above, a variety of techniques have been proposed to address the issue of fuel control and mixture preparation especially during the critical cold-start phase when mixture preparation is the most challenging.

U.S. Patents proposing fuel injection metering and firing techniques include U.S. Pat. No. 4,091,773, issued to Gunda, and U.S. Pat. No. 4,096,833, issued to Sweet, both of which disclose an asynchronous, pulse width modulated, multiple fire several times per engine cycle, fuel metering technique for single point fuel injection systems, wherein fuel is injected at a single point for multiple cylinders upstream of the fuel charge intake for the engine. Both temporal (engine cycle-to-cycle) and spatial (engine cylinder-to-cylinder) fuel stratification and variability are known challenges for single point fuel injection system and they have not been adopted. Also, this does not address the problem of reducing production of excess hydrocarbons on cold start-up.

U.S. Pat. No. 4,269,157, issued to Fujishiro, also proposes an asynchronous multiple fire fuel metering technique for single point fuel injection systems. It is further proposed to use frequency modulation as opposed to pulse width modulation to meter the fuel mass flow. As well as using the now less preferred single point injection approach, this does not address the problem of reducing production of excess hydrocarbons on cold start-up.

U.S. Pat. No. 4,724,816, issued to Kanno et al., discloses a synchronous pulse width modulation strategy for multi-point fuel injection systems that transitions between single injection firing and multiple injection firing depending on the amount of fuel required. It is said that, to deliver the amount of fuel required to start an engine with liquid fuel at very cold ambient conditions, the fuel injectors have to stay open for up to 13 times longer than under normal operating conditions (200 ms injection per engine cycle for cold start at very low temperatures compared to 15 ms injection per engine cycle at heavy engine load). This patent proposes using a sufficient number of short (15 ms or less) injection pulses to provide enough fuel for cold starts. The primary objective seems to be to save on the cost of electronics.

U.S. Pat. No. 5,076,238, issued to Rosenau et al., also proposes a pulse width modulation strategy for multi-point fuel injection systems that transitions between single injection firing for normal operating conditions and multiple injection firing during cold starts at very cold temperatures. It is claimed that by dividing the large amount of fuel needed for cold starts at very low temperatures into several equal fuel doses per engine cycle, the ability to start with liquid fuel at very low temperatures can be improved.

U.S. Pat. No. 6,085,718, issued to Nishimura et al., describes performing fuel injection in a specific pattern to provide a lean fuel mixture during cold start. This method delivers fuel in two steps with early and late split injections during the intake stroke.

U.S. Pat. No. 6,367,452, issued to Shima et al., describes a system that uses a fuel injection pump, in addition to a feed pump. A fuel metering valve is used that varies its opening area via the amount of current supplied to its solenoid. This fuel metering valve controls the pressure of the high-pressure fuel being delivered from the fuel injection pump. This process is synchronous with the engine.

While the last four patents may provide some improvement, because they provide liquid fuel for cold starts, they do not completely address the problem of excess hydrocarbons.

SUMMARY

To overcome problems in the prior art related to starting a cold internal combustion engine with reduced hydrocarbon emissions out of the tail pipe and other problems, there is provided a fuel injector system for vaporizing liquid fuel and metering the vapor to an internal combustion engine of an automobile, comprising: (1) at least one fuel injector with at least one capillary flow passage with a heat source arranged along the flow passage capable of heating liquid fuel in the flow passage to a level sufficient to vaporize it; (2) a solenoid operated metering valve located at the capillary outlet for metering vaporized fuel to the internal combustion engine; and (3) a system for operating the metering valve while delivering the vaporized fuel at an opening and closing frequency of at least 15 Hz or more preferably at least 60 Hz independent of engine rpm. With this invention, vaporized fuel is formed as an aerosol in the engine intake manifold with a mean particle size less than about 25 microns.

Preferred versions include using a low-mass ball valve assembly as the metering valve, constructing the capillaries from stainless steel or a nickel-chromium alloy with an internal diameter of about 0.020 to 0.030 inches (0.05 to 0.075 cm) and a heated length from about 1 to 3 inches (2.5 to 7.5 cm), and electrically and thermally insulating the capillary with a ceramic tube. Advantageously, the heat source is obtained by passing current through the walls of the capillary. The invention could be used as a port fuel injector or direct fuel injector.

The invention is not limited to providing vaporized fuel at start-up, but can be connected to a system that detects a particular engine operating condition (such as taking the vehicle transmission out of Park) and thereafter reduces the heat source to the point that the fuel is a liquid but warm enough to flash vaporize as exits the metering valve into the manifold and then reduces the metering valve frequency to be synchronous with the engine rpm. For example, at a slow idle of 600 rpm, the metering valve would be operated at 5 Hz, only.

To save electrical energy, when another operating condition occurs such as engine warm up or the passage of some time, the injector heat source can be turned off and operated as a conventional fuel injector.

As a method of delivering fuel to an internal combustion engine, the steps comprise: (1) supplying liquid fuel to at least one capillary flow passage of a fuel injector; (2) heating liquid fuel in the flow passage to the point of vaporization; and (3) metering the vaporized fuel to the internal combustion engine through a valve located at the outlet of the capillary flow passage using a periodic valve opening and closing at a frequency of at least 15 Hz or more preferably at least 60 Hz independent of engine rpm.

Normally, supplying vaporized fuel will be limited to start-up and other regimes where the mass flow requirement is not high. As a result when it is detected that the automobile transmission is being taken out of Park, the injector can change operation to a flash vaporization mode in which heating is turned down to the point that fuel is not vaporized, but still heated sufficiently to flash vaporize on exiting metering valve. In this mode, the metering valve frequency would be synchronized with the engine as for a conventional injector.

These methods are enhanced by using a low-mass ball valve assembly that has low thermal mass and wetted area. Heating the flow passage by passing current through the walls of the capillary has many advantages.

Of course, one could use the invention in different types of passenger and truck vehicles. The invention may be useful in hybrid-electric vehicles that start and stop many times in normal operation.

BRIEF DESCRIPTION OF THE DRAWINGS

The invention will now be described in more detail with reference to preferred forms of the invention, given only by way of example, and with reference to the accompanying drawings, in which:

FIG. 13 illustrates a typical power and temperature curve from capillary heater turn on.

DETAILED DESCRIPTION OF THE PREFERRED EMBODIMENTS

Reference is now made to the embodiments illustrated in FIGS. 1-14 wherein like numerals are used to designate like parts throughout.

Figure 1:
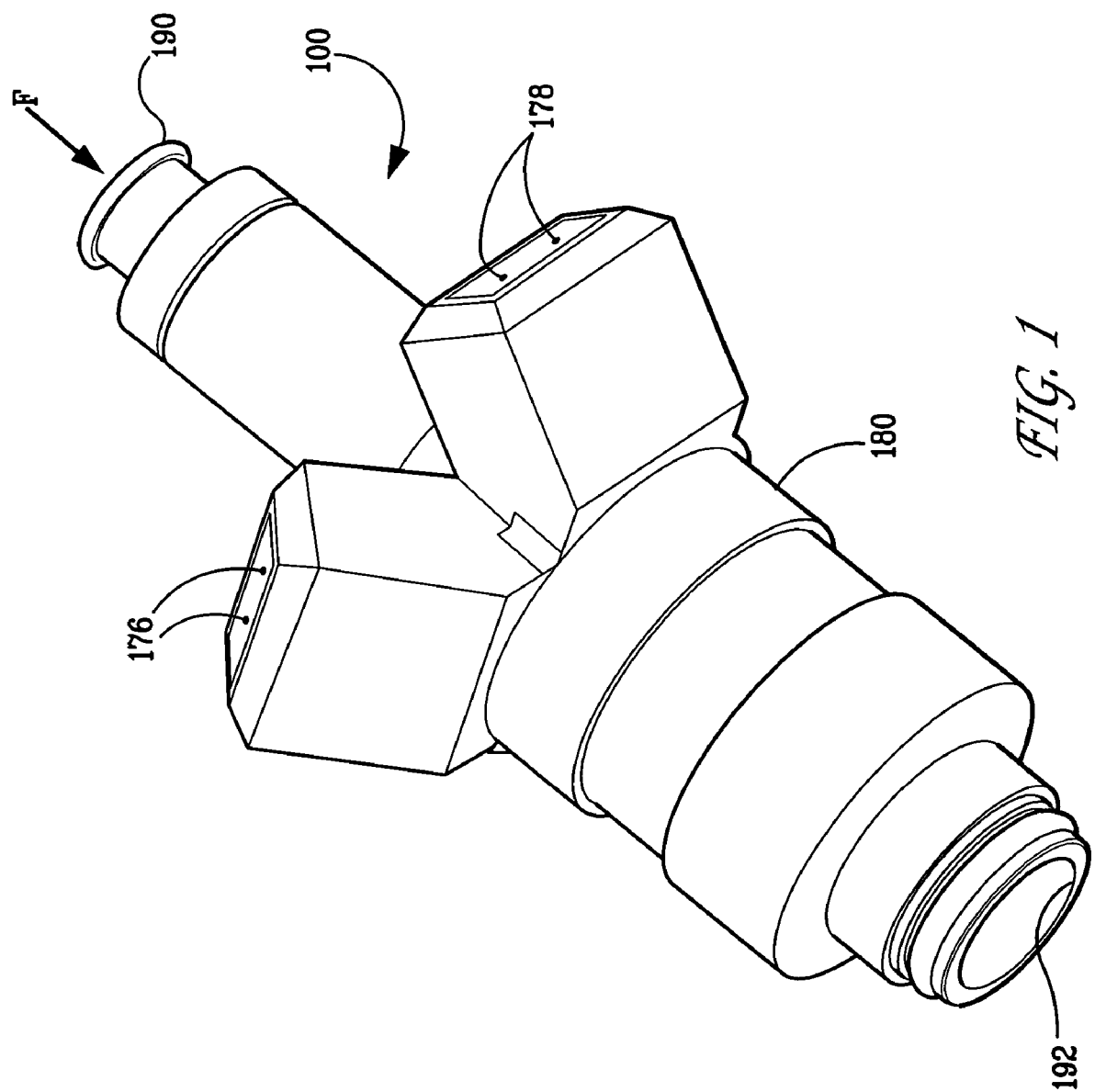
FIG. 1 shows an isometric outside view of the body of a multiple capillary fuel injector, in accordance with a preferred form of the invention.

Mechanical Components:

FIGS. 1-4 provide mechanical views of the invention. FIG. 1 illustrates a capillary fuel injector 100 for vaporizing liquid fuel drawn from a source of liquid fuel F, in accordance with a preferred form of the present invention. The capillary fuel injector 100 includes a fuel injector housing 180, an inlet 190 for admitting fuel F, and an outlet 192. Internally (not shown) there is a system for metering vaporized fuel 50 and a system for delivering an atomized stream of liquid fuel 70, positioned downstream of the system for metering vaporized fuel 50.

Fuel injector 100 is operable to transition from metering vaporized fuel to delivering an atomized stream of liquid fuel. In terms of form and fit, it may be designed in a manner similar to conventional port fuel injectors, so as to be substantially interchangeable therewith.

FIG. 1 also illustrates generic spade-lug connectors terminating wires 176 for a conventional internal solenoid with additional spade lugs 178 for supplying power to unconventional internal capillary heaters. Separate connector bodies are used so that the capillary heaters may be physically disconnected by disconnecting a plug without disabling the solenoid that operates a fuel metering valve.

As shown in detail in FIGS. 2 and 3, one form of the system for metering vaporized fuel 50 possesses a ball-in-cone valve assembly 150, illustrated on a larger scale in FIG. 4 discussed below. The system for metering vaporized fuel 50 also includes a capillary bundle 115 having a plurality of capillary flow passages 112, each having an inlet end 114 and an outlet end 116, with the inlet end 114 in fluid communication with the liquid fuel source F for introducing the liquid fuel in a liquid state into the capillary flow passages 112. The capillary bundle 115 is positioned within the central bore of the metallic injector housing 180 and metallic intermediate injector housing 130.

Capillary bundle 115 is shown having a plurality of capillary flow passages 112, each having the inlet end 114 positioned by inlet O-ring retainer 113 and the outlet end 116 terminating in a disc 117 and held in position by intermediate injector housing 130. The metal inlet retainer 113 is held in place by the rubber O-ring 111 that seals against fuel flow from source F that is in fluid communication with inlet end 114. A plastic coupling 170 attaches the inlet section 190 and inlet of the capillary bundle 115 to the intermediate injector housing 130. In one preferred embodiment, the capillary bundle 115 is surrounded by a ceramic sleeve 131. It is contemplated that, when fuel injectors of the type described herein are produced in high volume, rubber O-ring 111 may be replaced by a suitably compliant metal ring that would be affixed by laser welding or the like. As may be appreciated, it is necessary that such a ring be compliant in view of the fact that capillary bundle 115 expands during heating.

The system for metering vaporized fuel 50 also includes a heat source 120 arranged along each capillary flow passage 112. As is preferred, each heat source 120 is provided by forming capillary flow passage 112 from a tube of electrically resistive material, a portion of each capillary flow passage 112 forming a heater element when a source of electrical current is connected to the tubes as discussed herein below.

Fuel injector 100 advantageously functions in three distinct modes: a full vaporization mode, a flash vaporization mode and an atomized liquid mode. In the full vaporization mode, each heat source 120 is operable to heat the liquid fuel in each capillary flow passage 112 to a sufficient level to change from a liquid state to a vapor state and deliver a stream of vaporized fuel from the outlet end 116 of each capillary flow passage 112. As may be appreciated, this method of vapor delivery within the body of the injector minimizes the volume of material that comes into contact with the vaporized fuel and, therefore, also minimizes the thermal mass that must be heated in order to prevent premature condensation of the vapor. Under conditions wherein sufficient pressure drop exists from inside the capillary flow passages 112 to the engine intake manifold, advantageously, each heat source 120 may heat the liquid fuel in each capillary flow passage 112 to a sufficient level so that flash vaporization occurs on exiting the orifice 152 and results in a stream of largely vaporized fuel into the engine intake manifold.

To reiterate, in the flash vaporization mode of operation, the fuel is not heated to a fully vaporized state within capillary passage 112. As will be described in more detail below, the ambient pressure drop across ball-in-cone valve assembly 144 is utilized to vaporize a liquid fuel that has been heated to a point below the temperature required to vaporize the fuel within capillary passage 112. As will be appreciated by those skilled in the art, during part-load or idle conditions, manifold vacuum is relatively high, creating sufficient pressure drop to produce flash vaporization.

Currently, a preferred version of bundle 115 is comprised of four tubes of annealed 18/8 stainless steel (AISI Type 304) having a nominal 0.028 in. (0.07 cm) ID, a 0.032 in. (0.08 cm) OD, and a heated length of 2.00 in. (5.1 cm). The ceramic tube 131 is made of 94% alumina with an ID of 0.085 in. (0.22 cm) encompassing the bundle 115 and an OD of 0.104 in. (0.26 cm). The ceramic tube provides both electrical and thermal insulation for the capillary tubes.

In more general terms with respect to the capillaries, each capillary-sized fluid passage is preferably formed within a capillary body such as a single or multilayer metal, ceramic or glass body. Each passage has an enclosed volume opening to an inlet and an outlet, either of which, or both, may be open to the exterior of the capillary body or may be connected to another passage within the same body or another body or to fittings. The heater can be formed using a portion of the body; for example, a section of a stainless steel, as above, or a nickel-chromium alloy tube. A suitable alloy is sold under the trademark Inconel®, a registered trademark of the International Nickel Corporation. Alternately, the heater can be a discrete layer or wire of resistance heating material incorporated in or on the capillary body. Each fluid passage may be any shape comprising an enclosed volume opening to an inlet and an outlet and through which a fluid may pass. Each fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. In the case where the capillary passages are defined by metal capillary tubes, each tube can have an inner diameter of 0.01 to 3 mm, preferably 0.1 to 1 mm, still more preferably 0.3 to 0.75 mm. Alternatively, the capillary passages can be defined by transverse cross sectional area of the passage, which can be $8 \times 10^{-5}$ to 7 mm$^2$, preferably $8 \times 10^{-3}$ to $8 \times 10^{-1}$ mm$^2$ and more preferably $7 \times 10^{-2}$ to $4.5 \times 10^{-1}$ mm$^2$. Many combinations of multiple capillaries, various pressures, various capillary lengths, amounts of heat applied to the capillary, and different cross-sectional areas will suit a given application.

In the examples below, an optimum fuel rail pressure for supplying liquid fuel to the capillary flow passage is believed to be about 45 psig (300 kPa), which is close to the pressure used by many current automobiles. Too low a pressure would not produce enough mass flow through the capillaries to achieve the flow rates required. Too much would not allow the fuel enough time to absorb sufficient heat from the hot capillary walls and vaporize before exiting the capillaries. However, the length and diameter of the capillaries will affect the optimum fuel pressure and it may be different for different designs. One option is to use more capillaries, but four seems to be a good compromise for typical automotive fuel pressures and fuel flow requirements It is important that each capillary tube be characterized as having a low thermal inertia, i.e., thermal mass, so that each capillary passageway can be brought up to the desired temperature for vaporizing fuel as quickly as possible for a given amount of heater power. It is very desirable, if this can be close to 0.4 sec. (or shorter) for reasons given below, but longer times, e.g., 1 or 2 sec. may be acceptable.

The low thermal inertia also provides an advantage in rapidly cooling the capillaries when switching to a lesser heat or unheated modes of operation. Cooling is also a function of thermal conductivity from the hot capillaries to the relatively cooler injector body and its surroundings. To cool down more quickly, thermal path could be increased, but additional power would be required to keep the capillaries at any elevated temperature.

Figure 2:
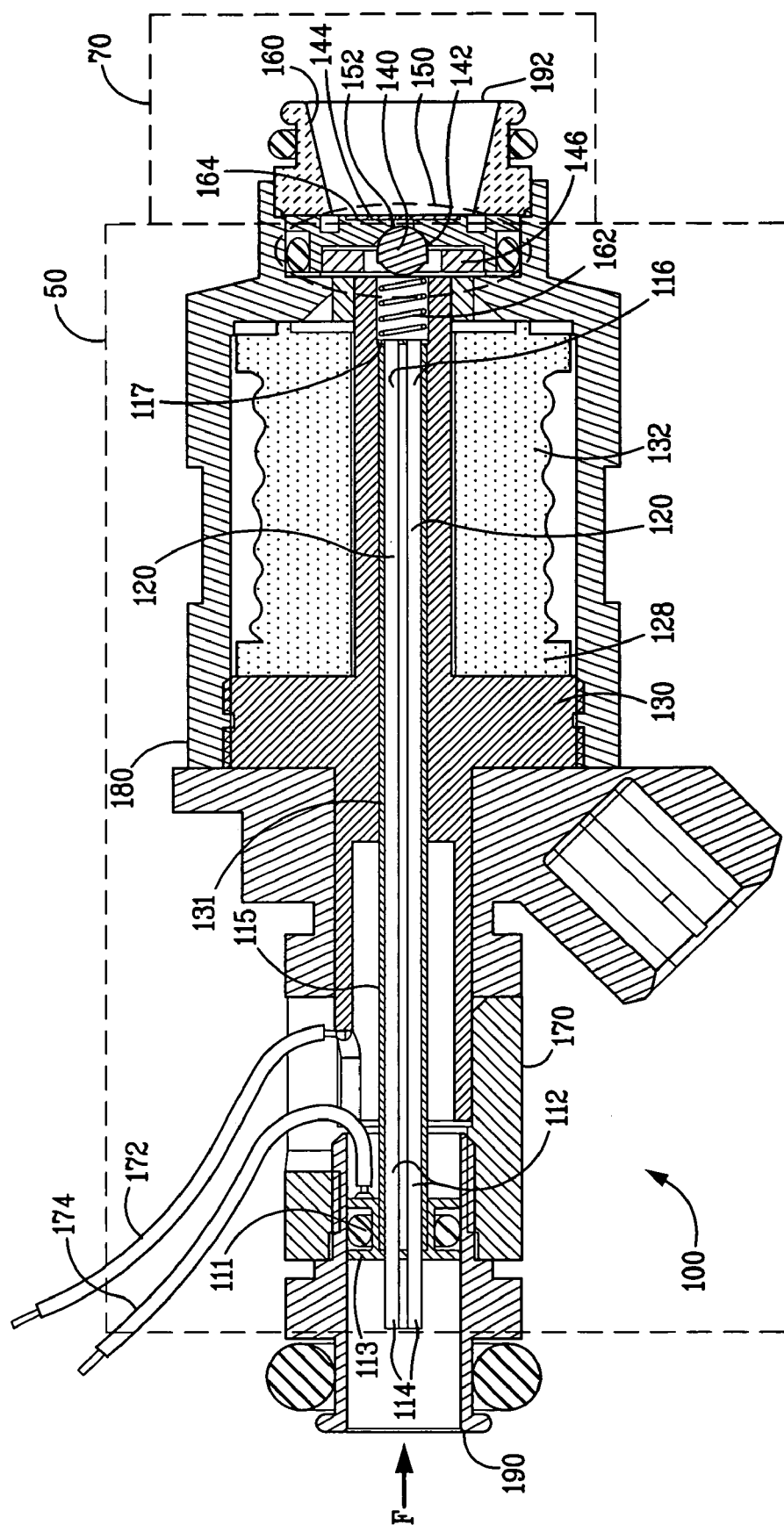
FIG. 2 is a partial cross-sectional side view of the multiple capillary fuel injector of FIG. 1.
Figure 3:
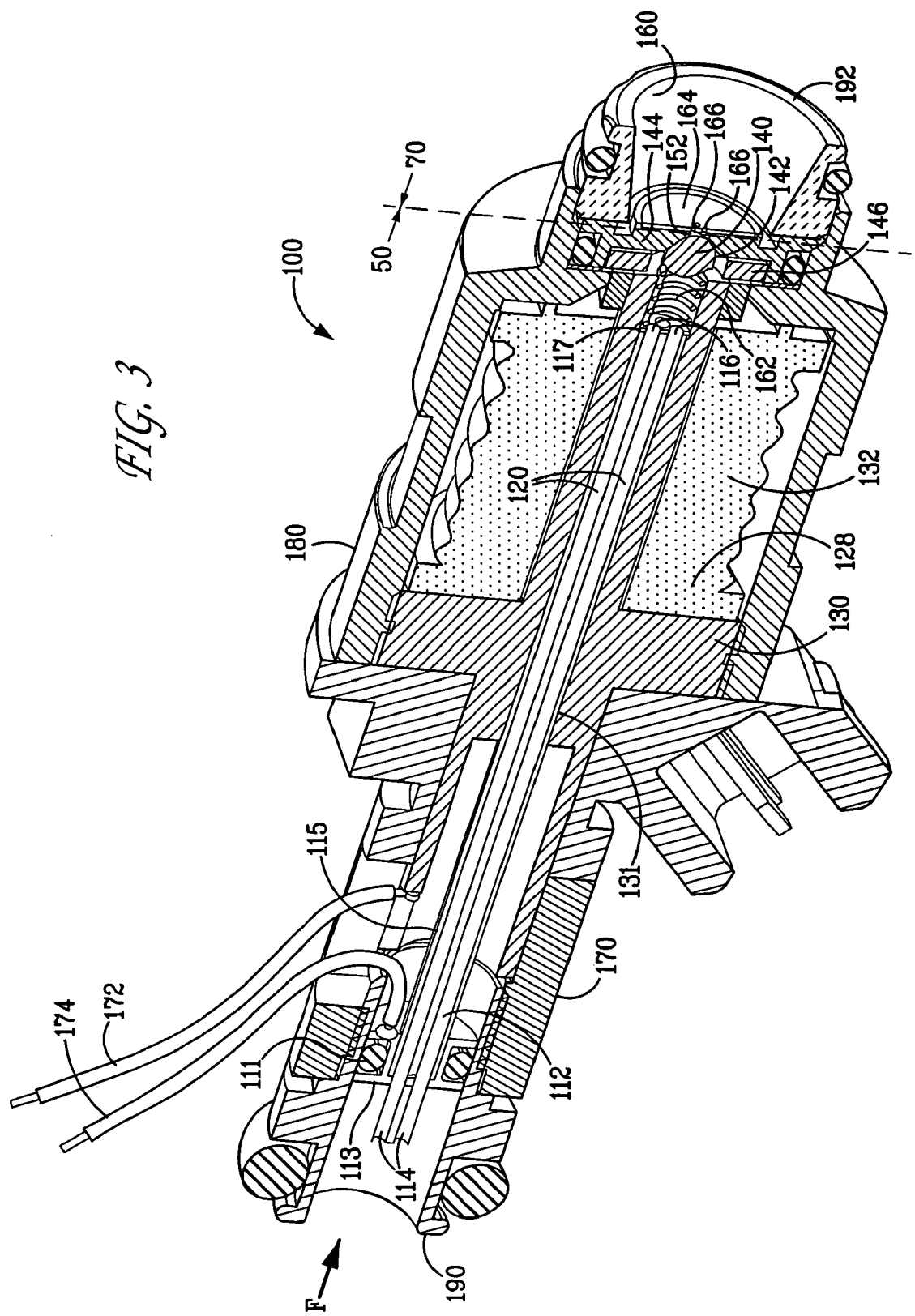
FIG. 3 is an isometric partial cross-sectional view of the multiple capillary fuel injector of FIG. 1.
Figure 4:
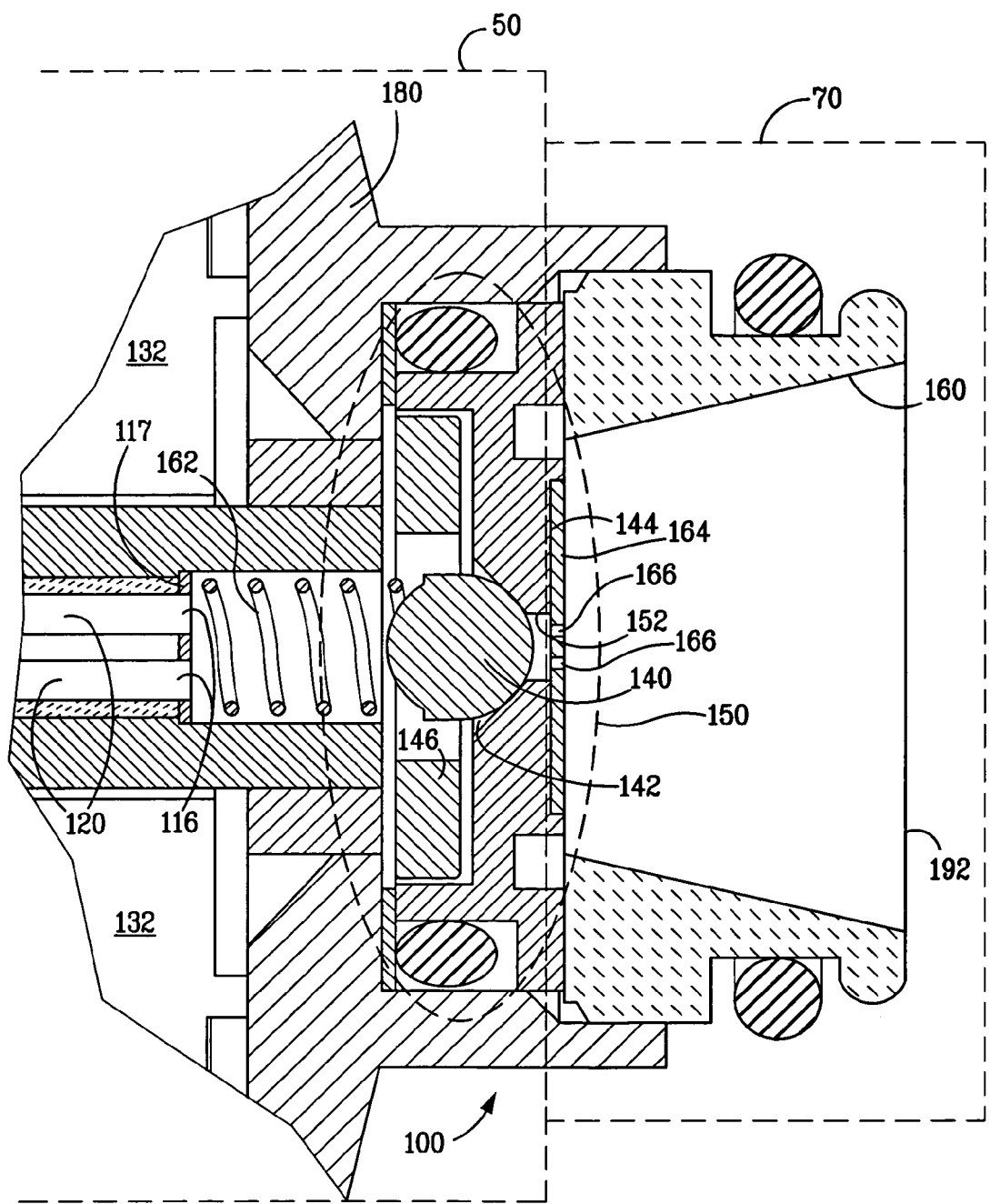
FIG. 4 is an enlarged partial cross-sectional view showing in detail the valve assembly of the multiple capillary fuel injector of FIGS. 2 and 3.

Referring now to FIGS. 2 and 3, with enlarged detail in FIG. 4, the low-mass ball valve assembly 150 is operated by solenoid 128. Solenoid 128 has coil windings 132 that may be connected to electrical connectors in any conventional manner. When the coil windings 132 are energized, a magnetic field is directed through plate 146, which is connected to ball 140, thereby causing it to lift from conical sealing surface 142 embedded in plate 144, exposing an orifice 152, and allowing fuel to flow. When electricity is cut off from the coil windings 132, a spring 162 returns the plate 146 and attached ball 140 to their original position. The spring 162 is dimensioned such that the force of the spring 162 pushing the ball 140 against the conical sealing surface 142 is sufficient to block the flow of pressurized fuel in the injector 100.

In an alternate embodiment, a solenoid element (not shown) could be drawn into the center of coil windings 132 to lift ball 140, which could be affixed to the solenoid element. Movement of the solenoid element, caused by applying electricity to the coil windings 132, would cause the ball 140 to be drawn away from conical sealing surface 142, exposing the orifice 152, and allowing fuel to flow. Again, when electricity is cut off from the coil windings 132, the spring 162 returns the ball 140 to its original position.

Upon exiting the outlet ends 116 of capillary passages 112, fuel flow is directed toward ball valve assembly 150. As with many conventional fuel injectors, ball-in-cone metering valve assembly 150 is operated with a solenoid 128. Actuating the solenoid 128 to move the assembly of plate 146 and ball 140 between the open and closed position serves to meter the flow of fuel exiting the injector 100.

Upon exiting the orifice 152, the fuel flows through the system for delivering an atomized stream of liquid fuel 70. The system 70 for delivering an atomized stream of liquid fuel 70 includes an atomizer plate 164, having a plurality of atomizing orifices 166 and a conical chimney section 160 to create the desired spray atomization and spray angle in the case of substantially liquid fuel sprays. The angle of the cone can span a wide range of values provided that the ball forms a seal with the surface of the cone. Chimney section 160 also serves to allow the injector 100 to satisfy overall length requirements of conventional port fuel injectors. However, proper operation of injector 100 is possible without the inclusion of the chimney section 160.

As may be appreciated, to heat the capillaries, it is important to make good electrical connections to the capillary bundle 115. Referring to FIG. 2, the wire 172 is connected to the metallic core 130. The capillary bundle 115 is insulated from core 130 by ceramic tube 131. However, at position 117, the capillary tubes 112 are laser welded to core 130 and make electrical contact thereto. Another wire 174 is then connected to a metal retainer 113 that is insulated from the core 130 by plastic coupling 170. However, retainer 113 is in electrical contact with the inlet ends 114 of the capillary passages 112. The heated length of the capillaries is, thus, the distance from the distal end of retainer 113 to the outlet at point 117. In practice, wire 172 could be at chassis ground potential and, in some cases, it might be possible to use the injector body as an electrical connection to chassis ground. However, the common practice for automotive port fuel injectors is to have a floating ground (i.e. the injector body is not relied upon as an electrical connection to chassis ground) and consequently wire 172 is most likely desirable.

In another method for achieving a good electrical connection, an insulated wire is included as part of the capillary bundle 115. In this method, the electrical connections are made prior to inserting the capillary bundle 115 into the injector 100. As previously described, the capillary bundle 115 is surrounded by insulating material (e.g., ceramic tube 131). The insulating material is then surrounded by an electrically conducting tube, which connects to disk 117 that is at the outlet ends 116 of the capillary bundle 115. Through this configuration, an electrical connection made at the inlet ends 114 of the capillary passages 112 results in the supply of electricity to the outlet ends 116 of the capillary bundle 115. Those skilled in electromechanical arts will be able to think of many other methods that are within the scope of subject matter disclosed herein.

The ball valve design 144 is believed to be an improvement over previous pintle valve designs used by the inventors because it has a lower thermal inertia and smaller wetted area. Combined, this means that fuel is not cooled excessively and possibly re-condensed before exiting orifices 166. Nevertheless, it should be readily recognized that the ball valve assembly 144 depicted in FIGS. 2-4 represents one of several valve designs that can be used in the design of the injectors of the present invention. The desirable features of a suitable valve design used to meter fuel vapor are the combination of low thermal inertia and minimal wetted area. Other suitable valve designs possessing these critical features are disclosed in U.S. application Ser. No. 10/342,267, filed on Jan. 15, 2003, the contents of which are hereby incorporated by reference for all that is disclosed. Moreover, while the illustrated metering valve assembly was satisfactory for a laboratory prototype, it is believed that those with ordinary skill in such arts could improve upon it, especially for production versions.

Referring to FIGS. 2 and 3, the electric circuit used to supply heat to the capillary passages 112 consists of a power supply (not shown) and a controller (discussed more fully below with respect to FIG. 11), capillary bundle 115, and wires 172 and 174 attached to the capillary bundle 115 to allow resistance heating of heated section 120 of the capillary passages 112.

Figure 5:
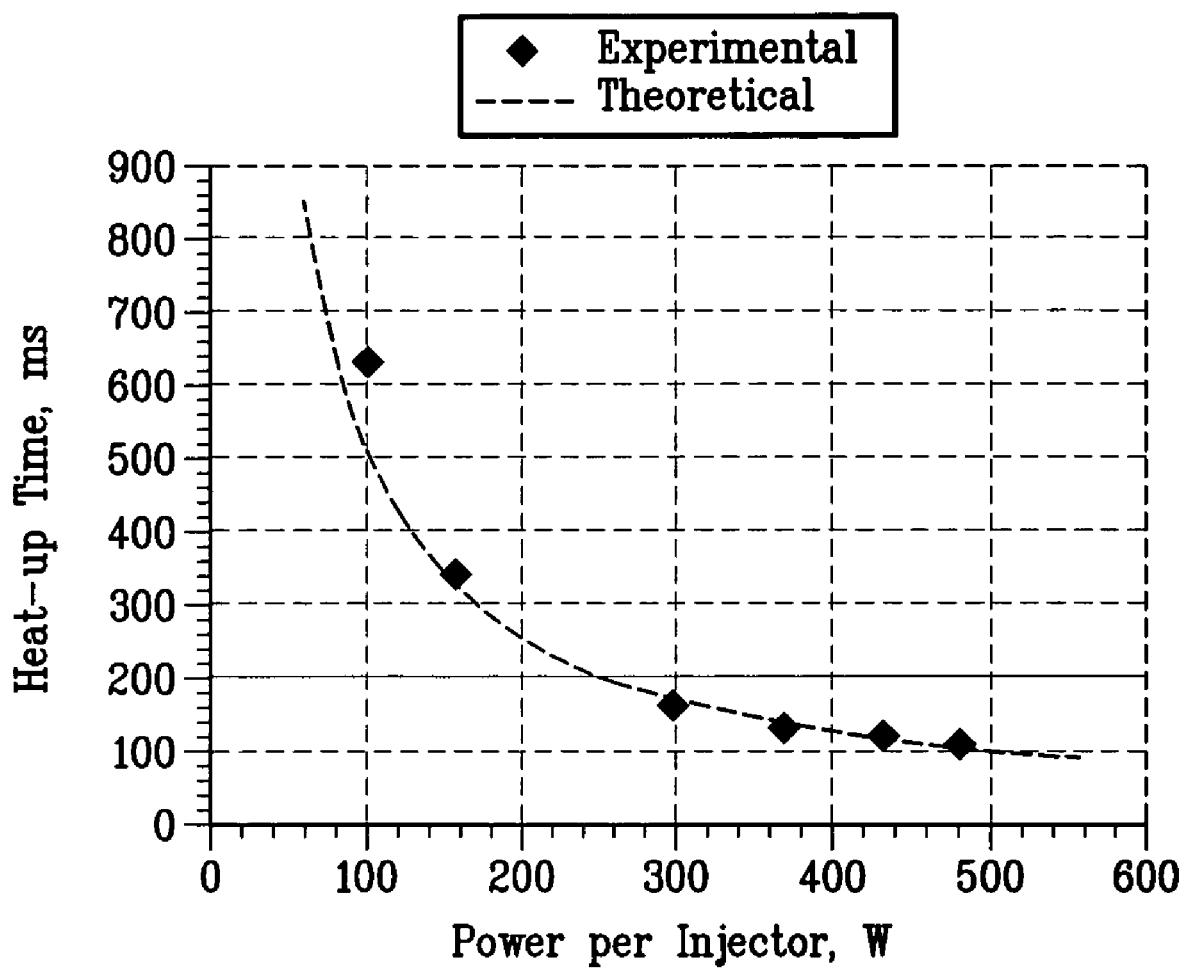
FIG. 5 is a chart illustrating the trade-off between minimizing the power supplied to the injector and minimizing the warm-up time associated with the injector.

Liquid and Vapor Fuel Delivery:

To achieve vaporization in a cold engine environment, there is a tradeoff between minimizing the power supplied to the injector for heating and minimizing the associated warm-up time, as shown in FIG. 5. This figure illustrates heating time as a function of power for a typical stainless steel capillary having a mass of 0.6 grams. Maximum power is limited by the available battery, while the injector warm-up time is limited by the need to start the engine as quickly as possible. A detailed example will be discussed below.

Figure 6A:
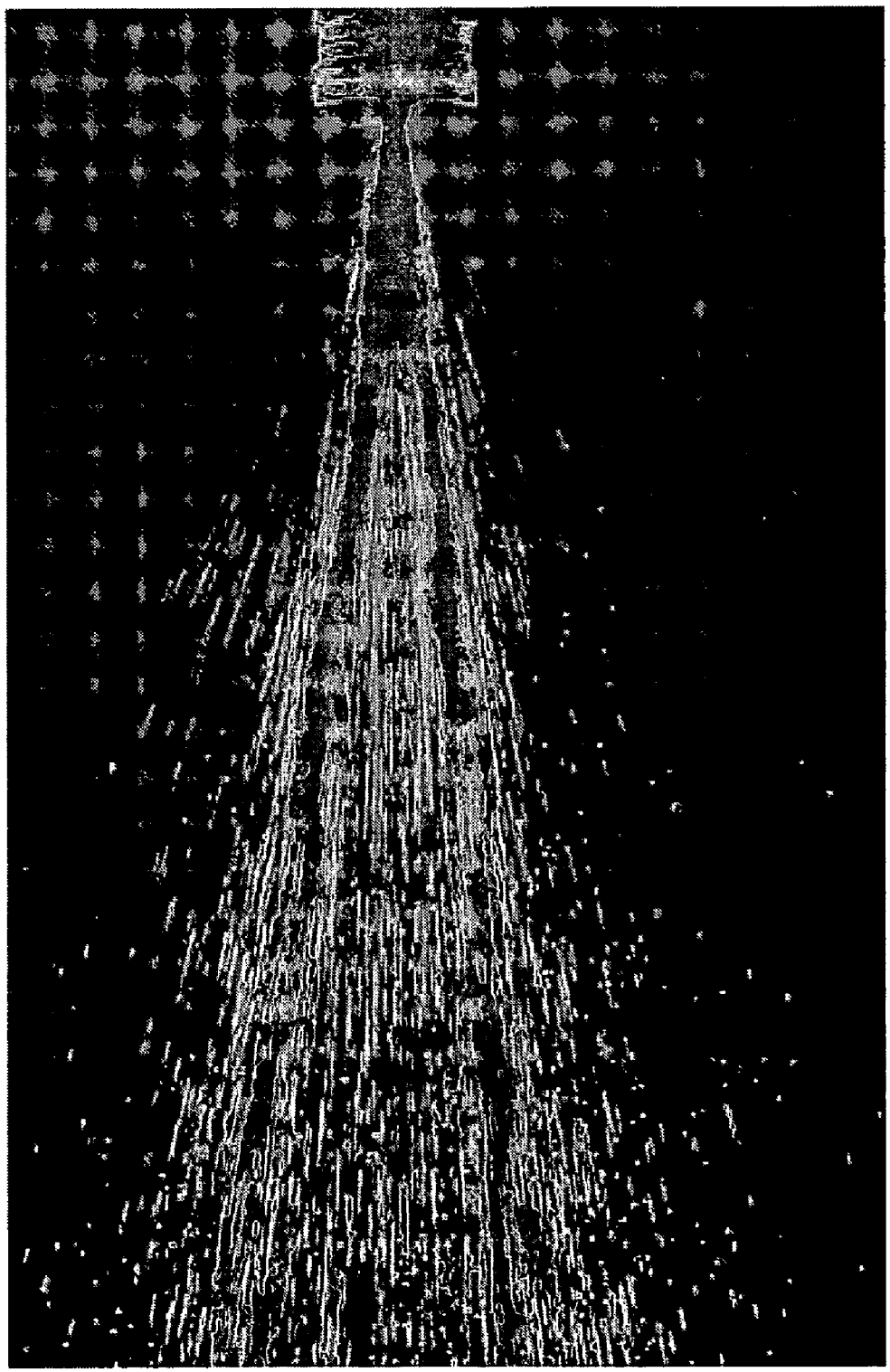
FIG. 6 shows photographs of the output of a conventional fuel injector (FIG. 6A) and this invention (FIG. 6B)
Figure 6B:
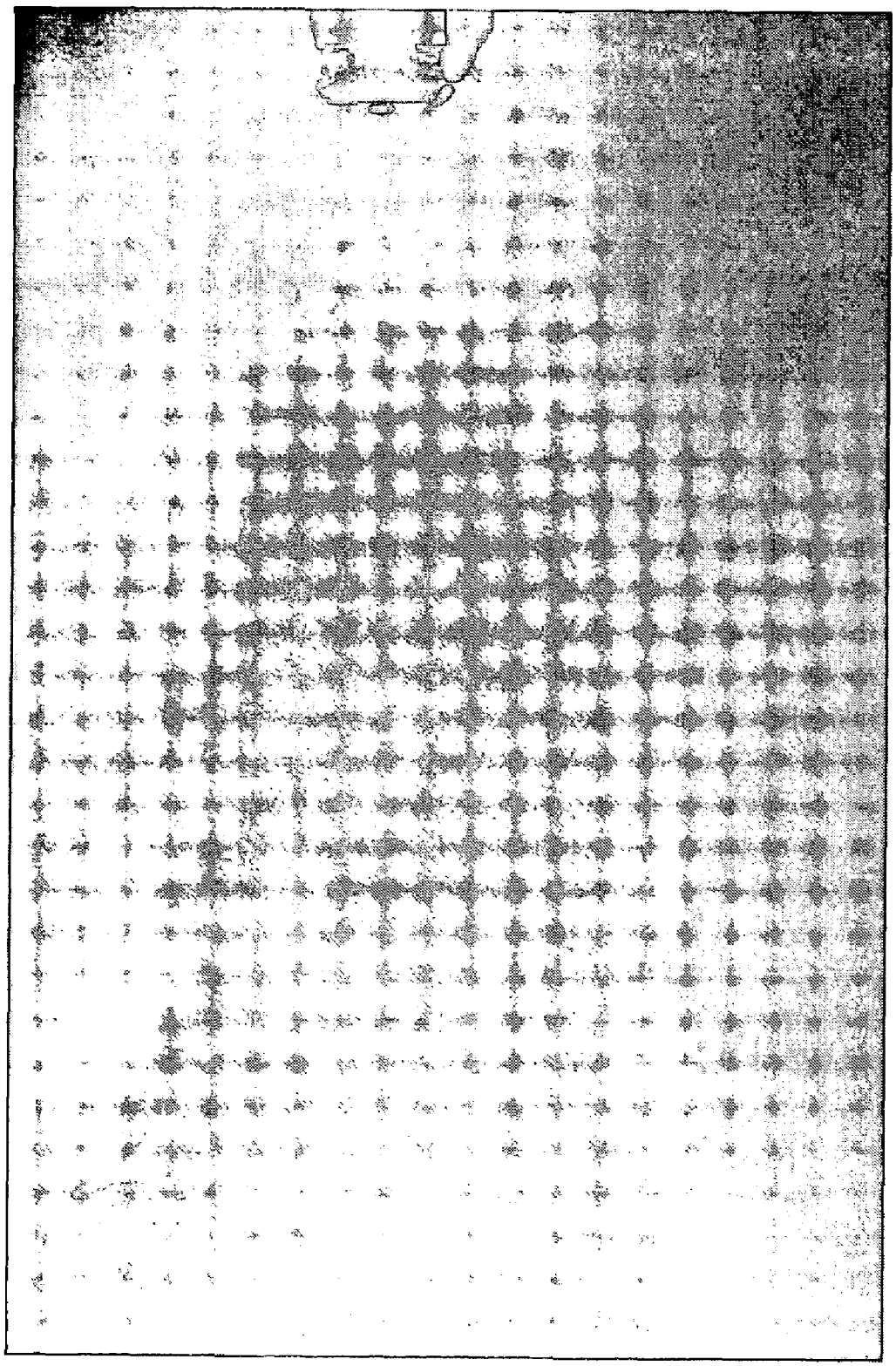

Laboratory bench tests were performed using gasoline supplied at constant pressure with a micro-diaphragm pump system. FIG. 6A is a photograph showing the aerosol formed at the output of a conventional port fuel injector and FIG. 6B shows the output of a heated capillary injector with fully vaporized gasoline into a 1 bar atmosphere. One can see that, initially, the emerging vapor is transparent, but forms an aerosol (very fine droplets) as it interacts with air. However, the droplet size is obviously dramatically smaller than for the conventional liquid fuel injector.

This earlier version used 6 inch long capillaries. However, these are too long to fit a conventional injector outline. Shorter, 2 inch long, capillaries do fit, but it was found that the length was too short to allow adequate heating. After some effort, it was discovered that pulsating the solenoid at a relatively high rate compared to engine speed produced good vapor quality with the shorter capillaries.

Figure 7A:
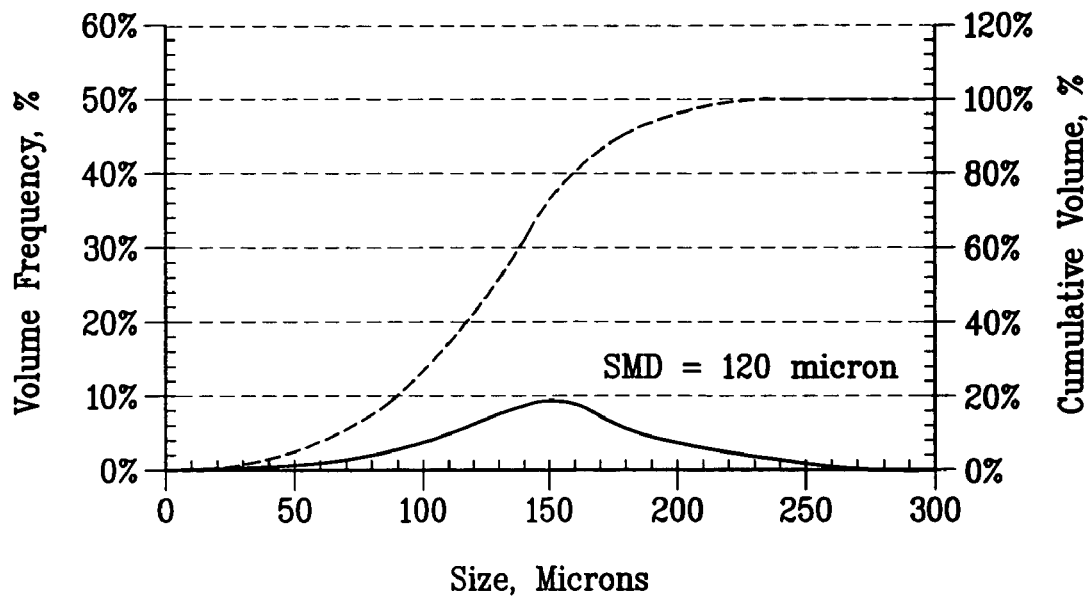
FIG. 7 shows graphs with measurements of the droplet size distribution for a conventional prior art port fuel injector (FIG. 7A) and this invention (FIG. 7B)

Peak droplet sizes and droplet size distributions were measured using a Spray-Tech laser diffraction system manufactured by Malvern. Droplet sizes are given in Sauter Mean Diameter (SMD). SMD is the diameter of a droplet whose surface-to-volume ratio is equal to that of the entire spray and relates to the spray's mass transfer characteristics. FIG. 7A shows the droplet distribution for a conventional port fuel injector. In this case, the fuel pressure behind the injector was 45 psig (300 kPa) and the solenoid metering valve was 100% on to produce a steady stream. The SMD was about 120 microns.

Figure 7B:
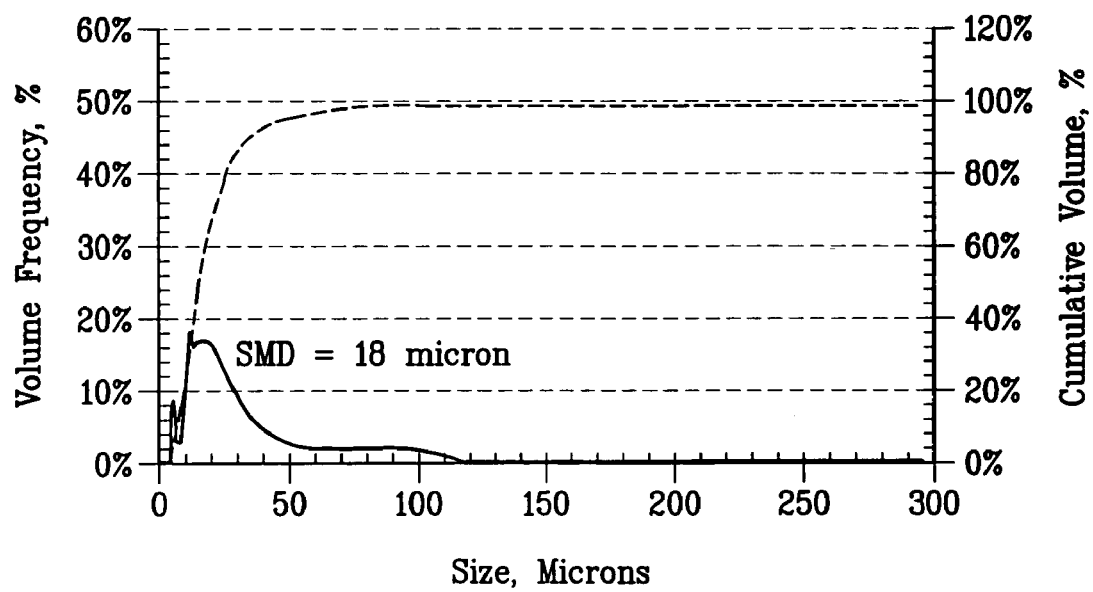

FIG. 7B shows the results for this invention's output. The fuel pressure was also 45 psig (300 kPa), but the capillaries of this invention were heated sufficiently to produce vaporization with the metering valve solenoid being operated at 60 Hz with a 35% duty cycle. The droplet SMD was dramatically reduced to 18 microns.

Figure 8:
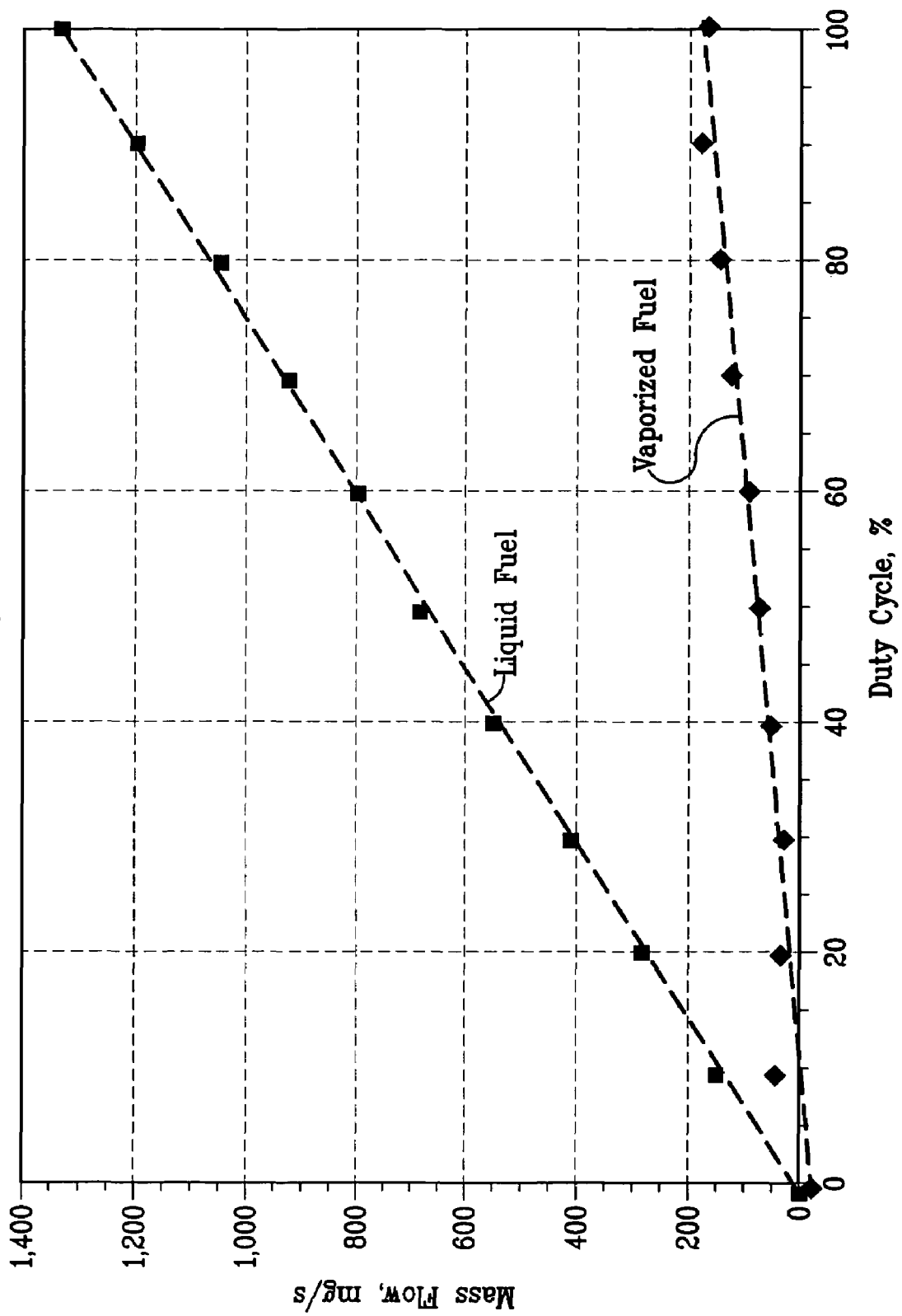
FIG. 8 presents mass flow measurements of liquid and vaporized fuel as a function of injector duty cycle for a bundle of four, 2 inch (5 cm) long capillaries.

As indicated in FIG. 8, a capillary injector having a bundle of four, 2 inch (5 cm) long capillaries of the type described above meters both liquid and vaporized fuel using the conventional and well-proven pulse width modulation technology. As of now, the results in FIG. 8 indicate that the liquid and vapor flow rate requirements for most automotive port fuel injection applications can be met with 2 to 4 thin-walled, 2 inch (5 cm) capillaries. Additionally, for any given duty cycle, the vapor mass-flow is about 14% of the liquid fuel flow. At high loads this would be a disadvantage. However, for cold start and idle, it becomes an advantage because the duty cycle of the metering valve at a 60 Hz operating frequency is still controllable. Note that conventional automotive control systems based on digital electronics typically use a lookup table having corresponding entries for mass flow and solenoid duty cycle. When vaporized fuel is also injected, a separate lookup table can easily be used for this regime taking into account the different flow rates.

Control:

With respect to controlling capillary heater power, as disclosed in U.S. application Ser. No. 10/284,180, filed on Oct. 31, 2002, now U.S. Pat. No. 6,913,004, issued Jul. 7, 2005, the contents of which are incorporated by reference in their entirety, the electrical resistance of the capillary flow passages themselves is used as a temperature sensor. As is well known, the electrical resistance of most metals increases with temperature in a predictable manner. This can be used as feedback to a temperature controller. Any of several temperature controllers, or temperature control algorithms in the case of a digital electronic control unit (ECU), can be used. In the working example described below, a digital version of a standard proportional-integral-derivative (PID) controller was implemented on a laboratory computer. Rather than control the absolute resistance, better control can be obtained by controlling the ratio, $R/R_o$, where $R_o$ is the resistance through wire 172, capillary bundle 115, and wire 174 when cold and R is the value of the same when hot.

To modulate the electrical power supplied to the capillaries, it is convenient to pulse the full battery voltage to the heaters with on/off control using pulse width modulation. Since the voltage from the battery is limited to nominally 12 volts, the resistance R (usually this can be easily calculated or measured) must be low enough to apply the needed power. For the examples described herein, R was always low enough. Note that, the inventors found that too much power heats the capillaries unevenly causing a hot spot in the middle, even though the average resistance is the one desired. FIG. 5, discussed above, shows that there is no need to apply more than 200 watts to achieve a short heat-up time. As anyone skilled in the art will appreciate, the power applied to the capillaries can be controlled with pulse width modulation ranging from 0 W at 0% duty cycle to a maximum power given by the battery voltage ($V_{bat}$) and capillary package resistance $R_{cap}$ as $(V_{bat})^2/R_{cap}$ at 100% duty cycle.

The preferred range for the temperature set-point of the stainless steel capillary for full vaporization is around an $R/R_0$ value of 1.12 to 1.3. For stainless steel, this range corresponds to a bulk capillary temperature range of about 140° C. to 220° C. The objective is to raise the temperature of the capillaries sufficiently to completely vaporize fuel in one mode or flash vaporize fuel in another, using the least amount of power. With laboratory instrumentation well known in the automotive field, these $R/R_0$ values can be readily determined.

Figure 9:
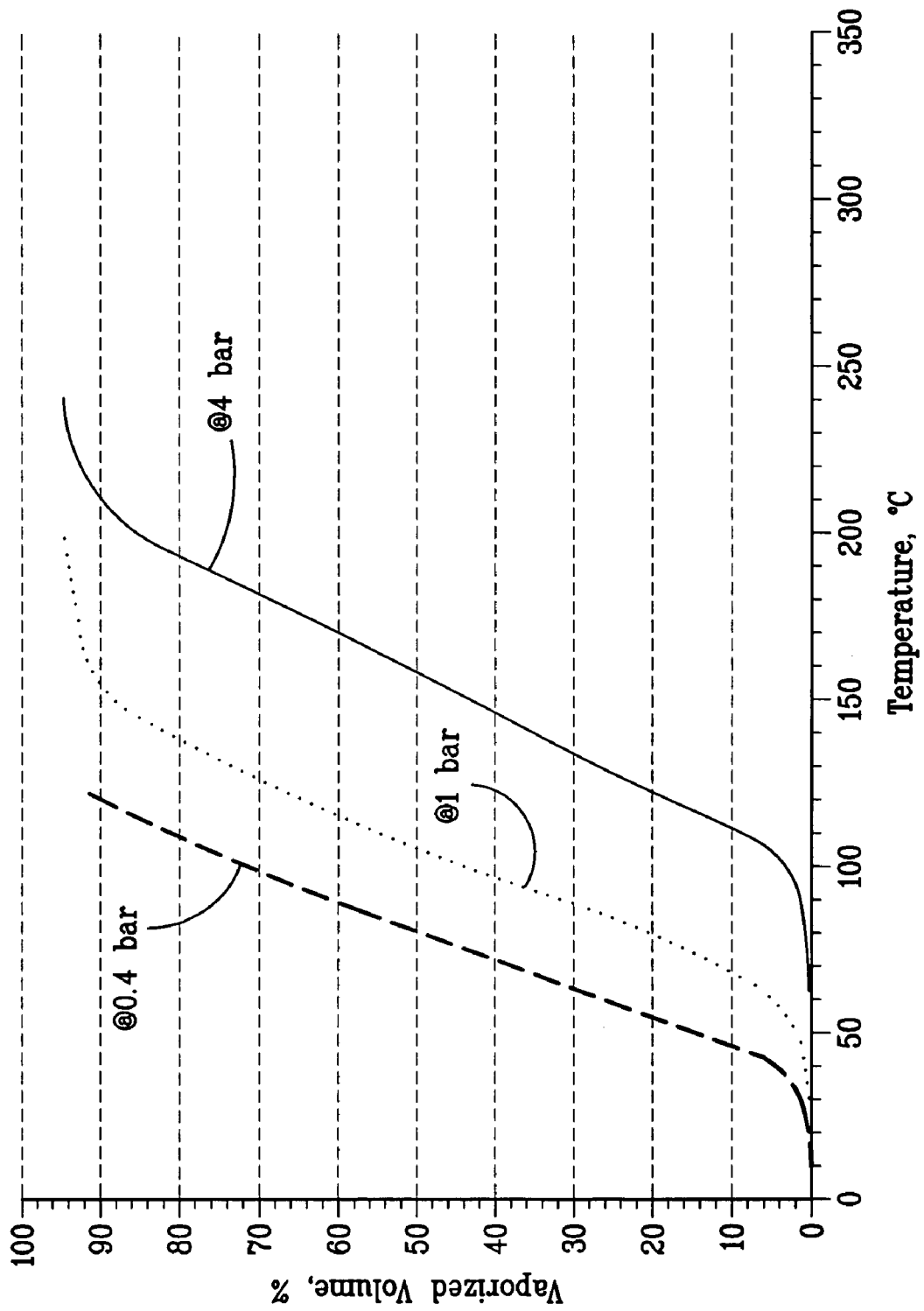
FIG. 9 shows gasoline vaporization curves as a fucntion of temperature at three ambient pressures.
Figure 10A:
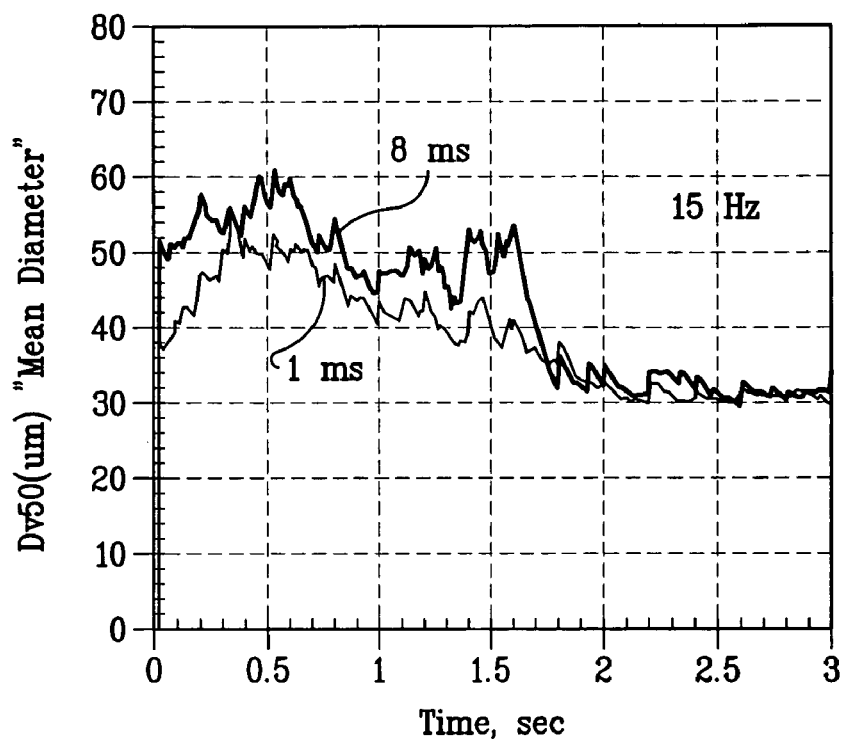
FIG. 10 shows measurments of droplet size produced by the invention with two control loop cycle times at a metering valve frequency of 15 Hz (FIG. 10A) and 60 Hz (FIG. 10B)
Figure 10B:
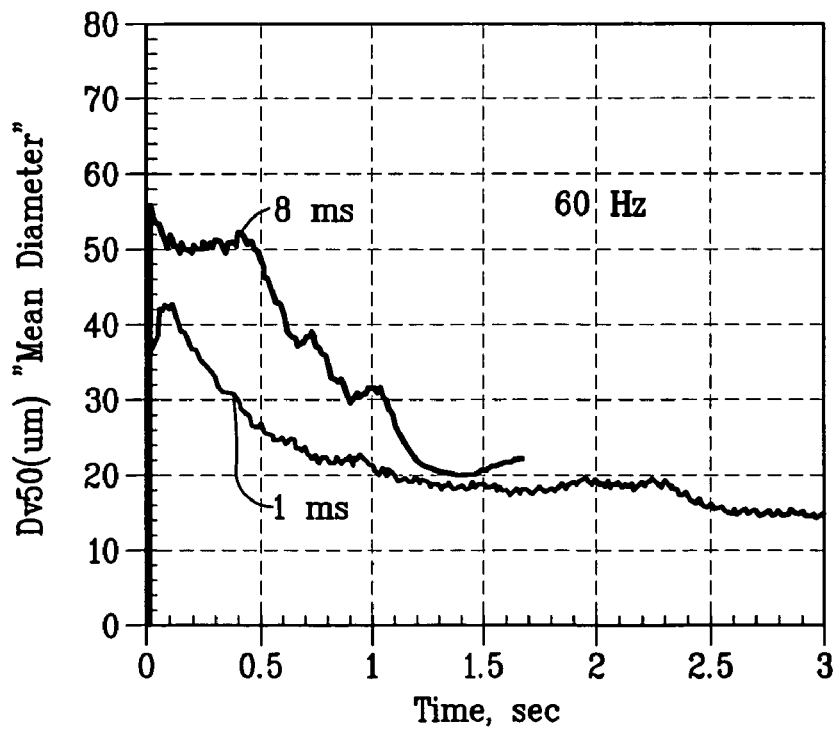
Figure 11:
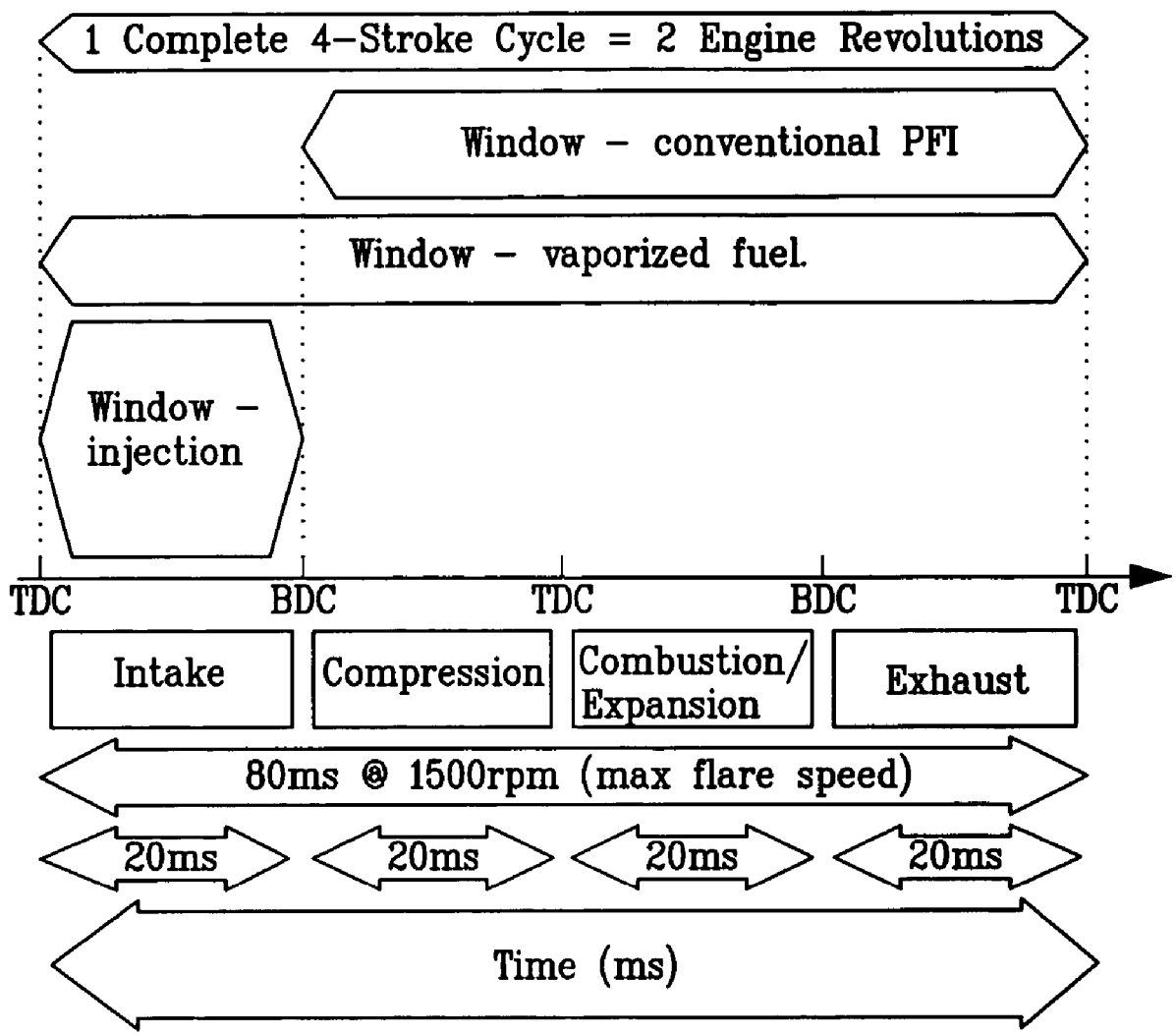
FIG. 11 is a chart illustrating various possible time windows for injecting fuel.
Figure 12:
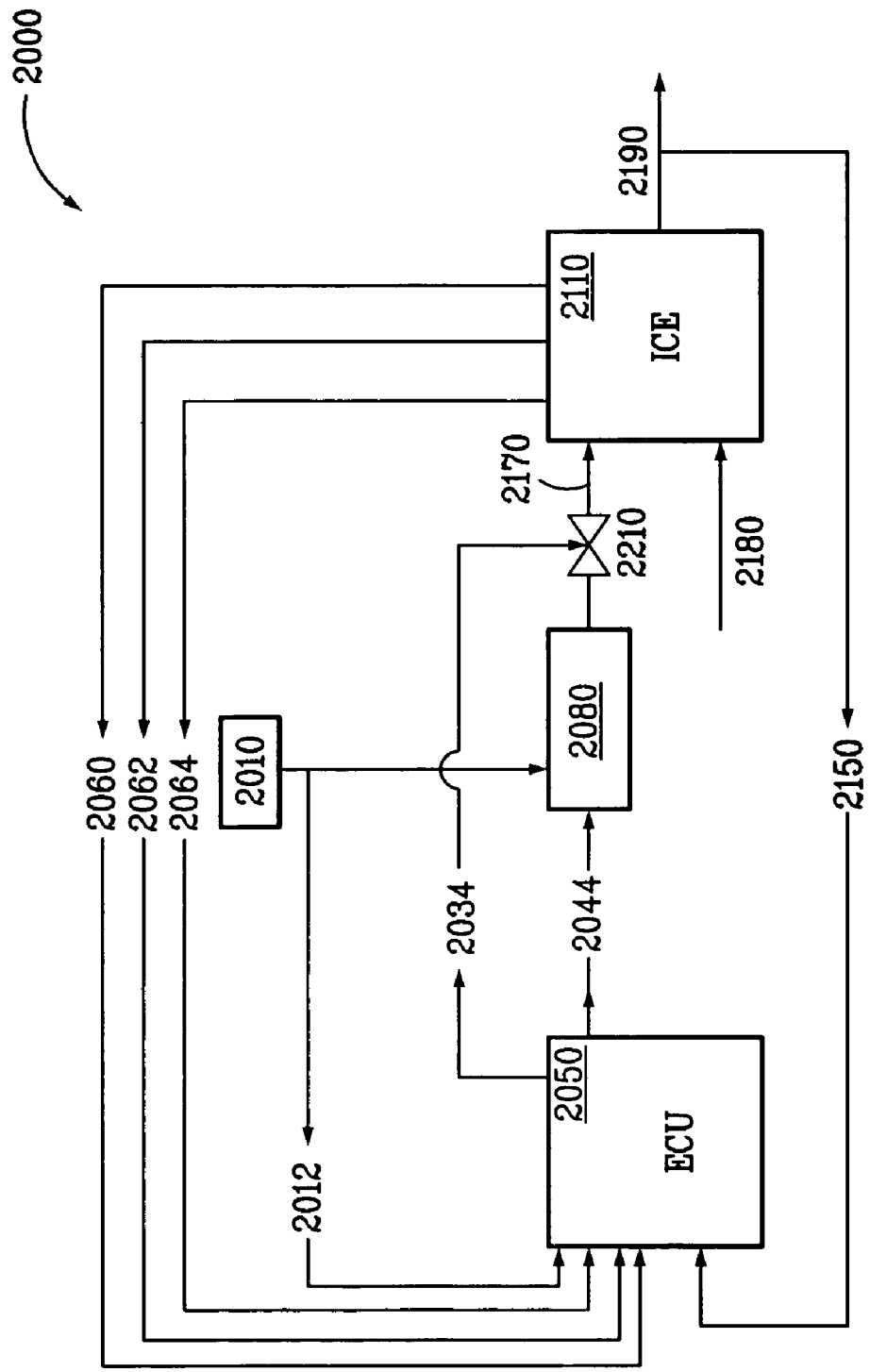
FIG. 12 is a schematic of a fuel delivery and control system, in accordance with a preferred implementation of the invention.

Nonetheless, as disclosed in U.S. Pat. No. 6,913,004, referred to above, for initial design purposes, it is useful to have some idea of the required temperatures for which knowledge of the distillation (or vapor) curve for the fuel of interest is needed. FIG. 9 shows vaporization curves for commercial gasoline as a function of temperature at absolute pressures of 0.4 bar, 1 bar, and 4 bar. (1 bar=1*E(+5) Pa.) Under atmospheric conditions (1 bar), vaporization normally ranges from an initial boiling point (IBP) for the lightest fractions around 20° C. to a final boiling point (FBP) for the heaviest fractions around 200° C. The temperature at which 50% of the fuel is vaporized ($T_{50}$) typically falls in the range of 80° C. to 120° C. This vapor curve shifts to lower temperatures at sub-atmospheric conditions (such as 0.4 bar in the intake manifold of an operating engine), and to higher temperatures at elevated pressures (such as 4 bar in the fuel system and fuel injector).

For a typical commercial gasoline, the temperature at which 50% is vaporized is close to 160° C. in the fuel injector, but may be as low as 80° C. in the intake manifold during idling. If the fuel in the fuel injector is maintained at 100° C., only a very small fraction (<5%) will be vaporized. However, as this fuel leaves the injector nozzle and enters the intake manifold at idling conditions (0.4 bar), most of the liquid fuel will flash vaporize, since the ambient pressure is lower than the 75% vapor pressure.

During cranking, the intake manifold pressure is atmospheric and thus the fuel pressure in the fuel injector is only four times higher than the intake manifold pressure. As such, the fuel temperature is deliberately controlled to levels well above the FBP at 4 bar. This is done to quickly heat up the capillaries and to ensure that the engine is supplied with high quality vaporized fuel for start-up. During cold-start idle, the intake manifold pressure is sub-atmospheric (0.4 bar) and thus the fuel pressure in the fuel injector is about ten times higher than the intake manifold pressure. In this case, it is possible to operate in a mode wherein the fuel temperature is lowered below the IBP at 4 bar so that the fuel in the injector is heated but remains liquid Consequently, all fuel in the injector is in the liquid phase so that fuel mass flow capacity of the injector can support the entire engine operating range, up to full load.

However, as fuel exits the injector into the sub-atmospheric conditions in the intake manifold, a fraction (up to about 50% at idle) will flash vaporize. This fuel vaporization in the manifold allows the use of a leaner air/fuel ratio and fewer hydrocarbon emissions.

Also, the slightly elevated temperature in the capillary flow passage can be beneficial for inhibiting deposit build-up since some fuel additives designed to keep engine components deposit free are temperature sensitive and do not function at low temperatures. For fully-warmed operation, the capillary is left unheated and the fuel injector functions much like a conventional port fuel injector.

As noted above, metering of vapor and liquid fuel is accomplished by energizing and de-energizing solenoid 132. When metering liquid fuel, the energizing pulse rate is synchronous with the engine with one injection pulse per engine cycle (i.e. every other engine revolution), ranging from 5 Hz at a slow idle of 600 rpm to 50 Hz at a 6000 rpm redline. However, when metering vaporized fuel, even at crank speeds of 300 rpm corresponding to 2.5 Hz, this invention uses a solenoid pulse rate of at least 15 Hz and more preferably at least 60 Hz. The vapor flow rate is controlled by controlling the injection duration or duty cycle. The aim is to produce an aerosol with the smallest droplet size while, depending on the amount of air the engine is consuming, meter the correct amount of fuel to operate the engine slightly lean of stoichiometric.

Clearly, the capillaries must be designed to produce sufficient mass flow of vapor. Moreover, the inventors have found that to obtain small SMD droplets in the aerosol (in particular during the first few seconds following injector warm-up) it is preferable to break up the conventional single fire injection pulse per engine cycle into several shorter injection pulses per engine cycle. It is hypothesized that breaking up the metered fuel into several smaller injection events spread out over the engine cycle (as opposed to one slug of fuel metered once per engine cycle) makes it easier for the heater controller to maintain the capillaries at an even temperature close to the target value.

FIG. 10 is a graph showing droplet size distribution with two different metering valve operating frequencies of 15 Hz and 60 Hz and two different heater control loop cycle times (the time between consecutive capillary heater power pulses) of 1 ms and 8 ms for 3 seconds after heater turn on. The purpose of this experiment was to test the ability to produce fully vaporized fuel. (Due to a software problem using the SMD instrument discussed previously, a different measuring system was used for these measurements. This instrumentation yields a droplet size that is typically 5 to 10 microns greater than the SMD, but it is the relative performance that is being illustrated.)

Because, as show in FIG. 5, the power is over 100 watts, digital control of heater power is more efficient that an analog approach. In the case illustrated, the heaters were turned on and off at 125 Hz for the 8 ms curve and 1 kHz for the 1 ms curve, but the injector metering valve duty cycles were a constant approximately 50%. Two results stand out. Clearly, a 60 Hz metering valve frequency produces smaller droplet sizes than 15 Hz. Also, 8 ms (125 Hz) is too long a heater control loop cycle time for optimum performance at 60 Hz (16.6 ms time periods). This may have been because there was an interaction between the relative phase of the two frequencies. The heater power and solenoid frequencies were not phase-locked at start up and were essentially asynchronous. Possibly, there could be a beneficial phase relationship or even an optimum relative heater power frequency. The 1 ms (1 KHz) frequency is fast enough so that the phase relationship with the 60 Hz solenoid frequency is probably not significant.

The fuel injectors disclosed herein can be positioned in an engine intake manifold at the same location as existing port-fuel injectors or at another location along the intake manifold. The fuel injectors disclosed herein provide advantages over systems that produce larger droplets of fuel that must be injected against the back side of a closed intake valve while starting the engine. Preferably, however, the outlet end of the fuel injector is positioned flush with the intake manifold wall similar to the arrangement of the outlets of conventional port fuel injectors.

Complete Cold Start and Run System:

FIG. 11 illustrates various possible time windows for fuel injector metering valve opening. Illustrated is a very well known timing diagram for a complete 4-stroke cycle of 2 engine revolutions. (TDC=top dead center & BDC=bottom dead center.) At 1500 rpm, for example, each stroke takes 20 ms. For conventional port fuel injectors injecting liquid fuel, it is highly desirable that liquid fuel is not injected during an intake stroke. Rather, it is injected onto the hot back of an intake valve while it is closed, during the window labeled “conventional”, vaporized in the manifold and inducted into the cylinder on the next intake stroke. When, however, the injector is emitting vapor, injection can take place while the intake valve is open as well, i.e., during the entire cycle as shown by the window labeled “vaporized. Although the inventors did not find this to be the case with engines tested, there is the possibility that vaporized fuel could re-condense in the manifold during some time while the intake valve is closed. In that case, injection only while the intake valve is open, during the window labeled “intake,” (or just before open) might be desirable.

Referring now to FIG. 12, a schematic of an exemplary control system 2000 is shown. (FIGS. 5-8 of the above referenced patent show a rather more detailed control system. There are many patents addressing the subject and production versions may be even more complicated. However, implementation of this invention with a control system should be well within the skill of those in the automotive field and only a basic explanation should be necessary.)

Control system 2000 is used to operate a conventional internal combustion engine (ICE) 2110 having a fuel input 2170, air input, 2180 and exhaust 2190. A fuel supply valve 2210 is in fluid communication with a liquid fuel supply 2010 and via capillary flow passages 2080. The control system includes a controller (ECU) 2050, which typically receives a plurality of input signals from a variety of engine sensors such as engine speed sensor 2060, intake manifold air temperature thermocouple and/or intake pressure sensors 2062, coolant temperature sensor 2064, exhaust air-fuel ratio sensor 2150, fuel supply pressure 2012, etc. In operation, the controller 2050 executes a control algorithm based on one or more input signals and subsequently generates an output signal 2034 to the fuel supply valve 2210 and a heating power command 2044 to a power supply (not shown) which delivers power to heat the capillary flow passages 2080.

The power command 2044 is an on/off signal. As noted above, it is more convenient to control heater power by controlling a duty cycle rather than use an analog variation in heater voltage.

The invention can be used in a number of different ways. The following example sequence is provided to be illustrative but not limiting. A number of obvious variations will occur to those skilled in these arts. From ignition key-on for a cold engine, the following steps would be performed during three stages: initial start-up, warm-up, and normal run.

At key-on, the ECU measures the cold resistance of the capillary bundle. Then a set point for $R/R_0$ that will ensure fuel vaporization is entered from a look up table. Heater power to the capillary bundle is turned on. Every time power is supplied to the capillary, the resistance R is measured, divided in value by $R_0$, and compared to the setpoint. As the setpoint is approached, the duty cycle is reduced and maintained at a value that keeps the ratio close to the setpoint.

Figure 13:
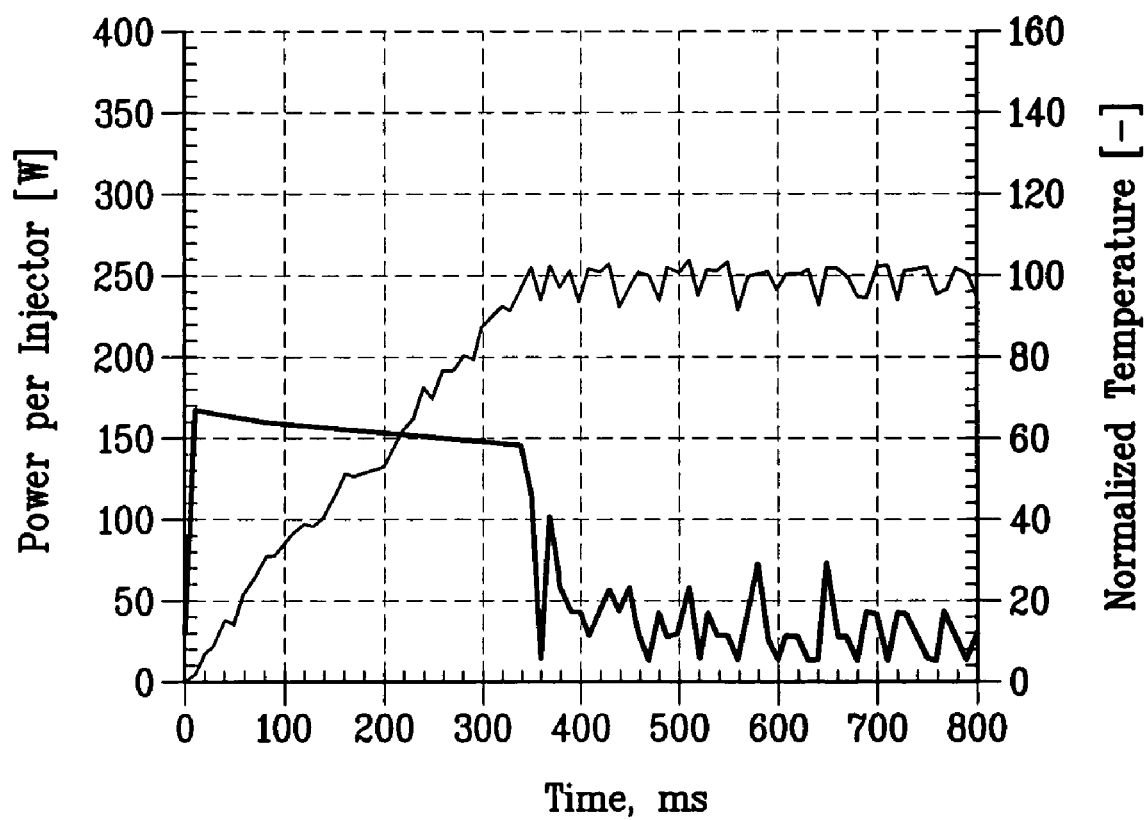

FIG. 13 illustrates typical power and temperature curve from key-on at room temperature. The initial power of 160 watts per injector is enough to reach the setpoint in 350 ms. In this example, power demand drops to less than 20 watts, because no fuel is flowing. The average 10-20 watt level is due to heat losses from the capillaries to the injector body and is considered to be good. Of course, when fuel is flowing through the capillaries, more power will be needed to make up for the heat lost out the capillary.

Compared to typical engine starts with conventional port fuel injector operation, 350 ms is not an excessive time period. It takes about that length of time for the ECU to obtain a synchronizing signal from the cam to start the conventional fuel injectors.

As soon as the vaporization temperature is reached, the injector metering valves are opened and closed with a selected fixed metering frequency and the amount of vapor injected is metered by pulse width modulation of the metering valve operation. Since this is a vapor, the prior art has suggested simply opening the metering valve and constantly injecting vapor into the manifold. Alternately, the prior art has suggested opening and closing synchronously with the engine at a 2.5 Hz rate corresponding to a typical 300 rpm crank speed. As noted above, this invention uses a frequency of at least 15 Hz and more preferably 60 Hz. Obviously, some value within this range could be selected. Also, sensibly higher frequencies would be limited primarily by the response time of the solenoid and the heater control frequency. For any combination capillary, heater controller, and solenoid design, it should not be difficult to determine an optimum solenoid frequency.

Because the metered fuel is essentially vaporized, it is not critical to synchronous metering with the engine. It could be, but it may be more convenient to not have to synchronize at start-up.

When the engine starts, engine speed temporarily flares up to about 1500 rpm and returns to idle speed. At some preselected point in time following the engine start (for example when the gearshift is moved out of park), the $R/R_0$ setpoint is reduced to one that would not vaporize fuel, but still enough to produce flash vaporization—this transition to flash vaporization will ensure that sufficient amount of fuel can be metered to support normal vehicle operation. Because of the low thermal mass, this condition is reached in a few injection events. Simultaneously, the fuel injection firing strategy is switched to synchronous single-fire sequential fuel injection (i.e. the fuel metering frequency is synchronized with the engine speed and lowered to one injection event per engine cycle and cylinder), and timed so as to keeping the metering valve closed when the intake port is open. In that regard, it is the same as a conventional port fuel injector.

In general, the flash vaporization mode could be employed for the balance of the engine duty cycle. However, in most cases it is desirable to avoid the power consumption associated with heating up the fuel electrically once it is not needed. One could end this mode at a fixed time such as after 60 seconds, or when the engine coolant temperature reaches a certain level, or some other event occurs.

During normal run, the capillary heaters are turned off and the injectors are run as conventional port fuel injectors.

Figure 14:
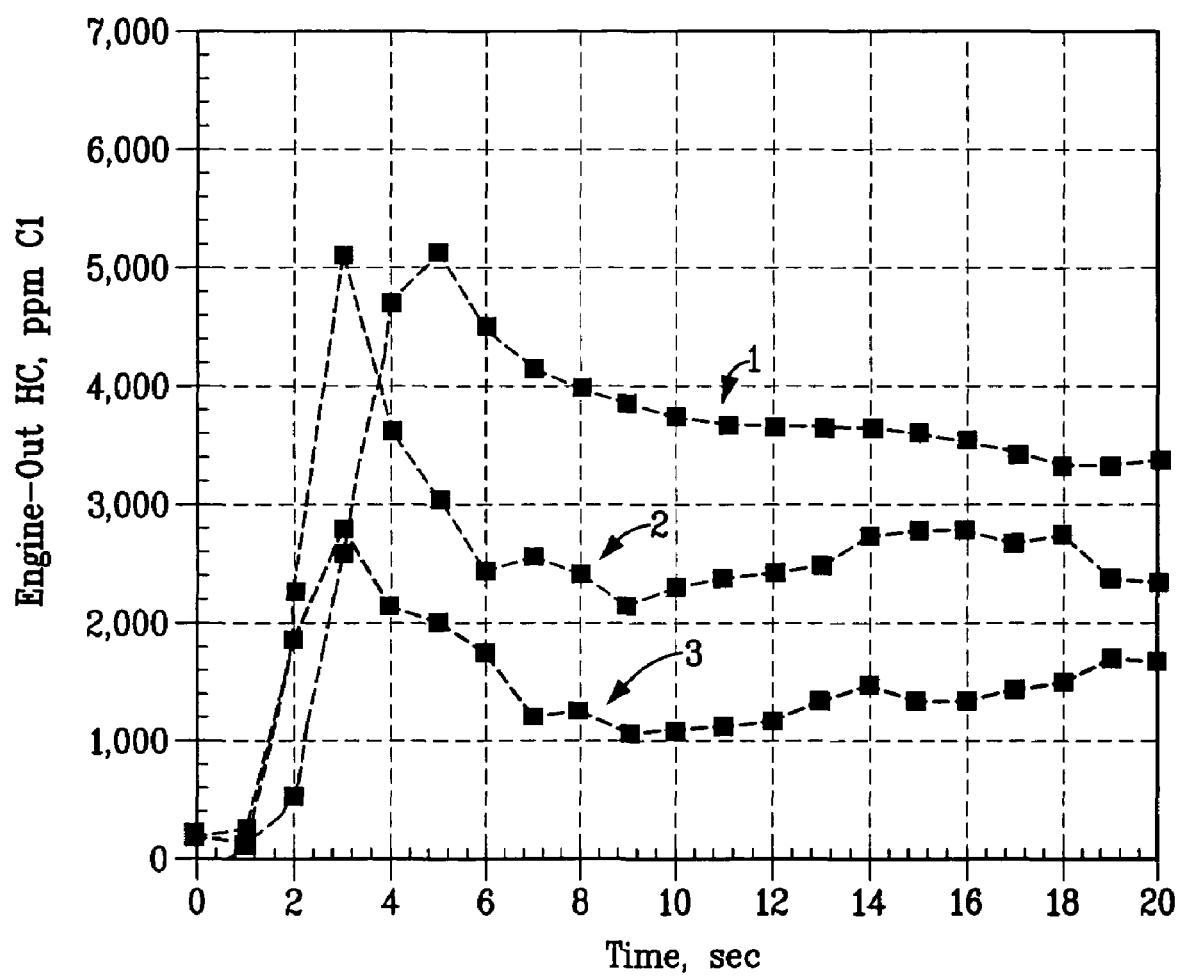
FIG. 14 shows measuerments of engine-out hydrocarbons for a 2004 model year automobile with a V-8 engine comparing the use of stock fuel injectors with this invention at two different ignition timings.

FIG. 14 shows three curves of hydrocarbons out of a gasoline engine for the first 20 seconds after key-on and start up. Curve #1 shows HC out of the tailpipe of a 2004 model year passenger automobile with a V-8 engine using stock port fuel injectors at an initial coolant and lubricant temperature of 75° F. (24° C.). This was produced by a third party. Curve #2 shows the results of a similar engine, bench tested by the inventors, using the injectors of the present invention at an initial colder temperature of 33° F. (0.5° C.) and an ignition timing of 10° BTDC (before top dead center). Curve #3, shows the same as in curve #2 with an ignition timing at TDC.

One can see that, although emissions from stock automobile engines have improved considerably in the last few years, even at the colder temperatures, this invention provides a noticeable improvement, especially when the ignition timing is retarded from the usual setting. The integrated amount on the lower curve is estimated to be less than a third the amount for the stock injector.

As someone skilled in the art will appreciate, it is common practice to retard the spark timing (e.g. from 10° BTDC to TDC) during cold starting as much as possible to reduce emissions of unburned hydrocarbons and increase the exhaust temperature for faster catalyst light off. The amount of spark retard that can be used is limited by the combustion stability of the engine—in other words if the spark timing is retarded beyond the stability limit of the engine the idle smoothness will suffer and actually produce excess hydrocarbons. Thus, it has been demonstrated that improved mixture preparation (such as that afforded by the vaporized fuel provided by this invention) can be effective in improving the combustion stability during cold starting and thus enabling more aggressive spark retard to be used.

U.S. application Ser. No, 10/841,718, filed on May 7, 2004, is also incorporated herein in its entirety by reference.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A fuel injector system for vaporizing and metering a liquid fuel to an internal combustion engine, comprising:
    (a) at least one fuel injector having at least one capillary flow passage, said at least one capillary flow passage having an inlet end to admit liquid fuel from a fuel rail and an outlet end;
    (b) a heat source arranged along said at least one capillary flow passage, said heat source obtained by passing current through the walls of said capillary and operable to heat the liquid fuel in said at least one capillary flow passages to a level sufficient to change from the liquid state to a vapor state and deliver vaporized fuel from said outlet end of said at least one capillary flow passage;

(c) a solenoid operated valve for metering vaporized fuel to the internal combustion engine, said valve located proximate to said outlet end of said at least one capillary flow passage; and (d) a system for operating said metering valve while delivering vaporized fuel at an opening and closing frequency of at least 60 Hz, wherein the vaporized fuel forms an aerosol prior to combustion with a mean particle size distribution less than about 25 microns.

2. The fuel injector of claim 1, wherein said valve for metering fuel to the internal combustion engine is a low-mass ball valve assembly operated by a solenoid.

3. The fuel injector of claim 1, wherein said at least one capillary flow passage is formed within a tube selected from the group consisting of stainless steel and nickel-chromium alloy and having an internal diameter from about 0.020 to about 0.030 (0.05 to 0.075 cm) inches and a heated length from about 1 to about 3 inches (2.5 to 7.5 cm) and is electrically and thermally insulated with a ceramic tube.

4. The fuel injector of claim 1, wherein the injector is of the port fuel injection type.

5. The fuel injector of claim 1, wherein the injector is of the direct fuel injection type.

6. The fuel injector of claim 1, further being connected to a system for detecting an engine operating condition and reducing the heat output of said heat source so the fuel is substantially liquid but warm enough to flash vaporize on exiting said metering valve and reducing said metering valve frequency to be synchronous with the engine rpm.

7. The fuel injector of claim 6, wherein the internal combustion engine is installed in an automobile having a transmission having at least a reverse gear, forward gears and a park position, wherein said operating condition comprises moving the transmission from park.

8. The fuel injector of claim 6, further being connected to a system for detecting an engine operating condition and turning the heat output of said heat source off so the fuel is unheated liquid on exiting said metering valve and maintaining said metering valve frequency to be synchronous with the engine rpm.

9. A method of delivering fuel to an internal combustion engine, comprising the steps of:

(a) supplying liquid fuel to at least one capillary flow passage of a fuel injector;

(b) causing vaporized fuel to pass through an outlet of the at least one capillary flow passage by heating the liquid fuel in the at least one capillary flow passage said heating is obtained by passing current through the walls of said capillary;

(c) metering the vaporized fuel to the internal combustion engine through a valve located proximate said outlet of the at least one capillary flow passage using a periodic valve opening and closing at a frequency of at least 60 Hz, and (d) ceasing to cause vaporized fuel to pass through said outlet at a selected automobile operating condition or fixed time after start-up and delivering fuel that is heated sufficiently to flash vaporize on exiting said outlet and changing said periodic frequency to be coincident with said engine rpm.

10. The method of claim 9, wherein said steps of causing vaporized fuel to pass through an outlet of the at least one capillary flow passage and of metering the vaporized fuel to the internal combustion engine is limited to start-up of the internal combustion engine.

11. The method of claim 9, wherein the internal combustion engine is installed in an automobile having a transmission having at least a reverse gear, forward gears and a park position, wherein said selected automobile operating condition comprises moving the transmission from park.

12. The method of claim 9, wherein said vaporized fuel mixes with air and forms an aerosol prior to combustion with a mean particle size distribution less than about 25 microns.

13. The method of claim 9, wherein in step (c) the valve for metering fuel to the internal combustion engine is a low-mass ball valve assembly operated by a solenoid.

14. The method of claim 9, wherein said injectors are of the port fuel injector type.

15. An automobile comprising:

(a) an internal combustion engine positioned within a body; and (b) a fuel system for fueling said internal combustion engine, said fuel system including:

(i) a plurality of fuel injectors, each of said plurality of fuel injectors having an inlet and an outlet and including (1) a fuel injector housing; (2) a system for metering vaporized fuel to the internal combustion engine, said system operable to meter vaporized fuel to the internal combustion engine through a valve located proximate said outlet of the at least one capillary flow passage using a periodic valve opening and closing at a frequency of at least 60 Hz; and (3) a system for delivering an atomized stream of liquid fuel to an internal combustion engine, said system positioned within said fuel injector housing;

(ii) a liquid fuel supply system in fluid communication with said plurality of fuel injectors; and (iii) a controller in electronic communication with the plurality of fuel injectors and adapted to select delivery of vaporized fuel or liquid fuel from said plurality of fuel injectors.

16. The automobile of claim 15, wherein the automobile is a hybrid-electric vehicle.

17. A fuel injector system for vaporizing and metering a liquid fuel to an internal combustion engine, comprising:

(a) at least one fuel injector having at least one capillary flow passage, said at least one capillary flow passage having an inlet end to admit liquid fuel from a fuel rail and an outlet end;

(b) a heat source arranged along said at least one capillary flow passage, said heat source obtained by passing current through the walls of said capillary and operable to heat the liquid fuel in said at least one capillary flow passages to a level sufficient to change from the liquid state to a vapor state and deliver vaporized fuel from said outlet end of said at least one capillary flow passage;

(c) a solenoid operated valve for metering vaporized fuel to the internal combustion engine, said valve located proximate to said outlet end of said at least one capillary flow passage; and (d) a system for operating said metering valve while delivering vaporized fuel at an opening and closing frequency of at least 60 Hz, wherein said fuel injector is connected to a system for detecting an engine operating condition and reducing the heat output of said heat source so the fuel is substantially liquid but warm enough to flash vaporize on exiting said metering valve, wherein said system for detecting an engine operating condition and reducing the heat output of said heat source also reduced said metering valve frequency to be synchronous with the engine rpm.

18. The fuel injector of claim 17, wherein said system for detecting an engine operating condition and reducing the heat output of said heat source also is effective to turn the heat source off so the fuel is unheated liquid on exiting said metering valve and maintaining said metering valve frequency to be synchronous with the engine rpm.

* * * * *